US010388157B1

(12) United States Patent
Hayes et al.

(10) Patent No.: US 10,388,157 B1
(45) Date of Patent: Aug. 20, 2019

(54) PROCESSING SYSTEM HAVING A MACHINE LEARNING ENGINE FOR PROVIDING A CUSTOMIZED DRIVING ASSISTANCE OUTPUT

(71) Applicant: Allstate Insurance Company, Northbrook, IL (US)

(72) Inventors: Howard Hayes, Glencoe, IL (US); Sunil Chintakindi, Menlo Park, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/919,313

(22) Filed: Mar. 13, 2018

(51) Int. Cl.
| B60Q 1/00 | (2006.01) |
| G08G 1/0962 | (2006.01) |
| G08G 1/16 | (2006.01) |
| G06K 9/00 | (2006.01) |
| G08G 1/01 | (2006.01) |

(52) U.S. Cl.
CPC ..... *G08G 1/09626* (2013.01); *G06K 9/00798* (2013.01); *G06K 9/00805* (2013.01); *G08G 1/0129* (2013.01); *G08G 1/163* (2013.01); *G08G 1/167* (2013.01)

(58) Field of Classification Search
None
See application file for complete search history.

(56) References Cited

U.S. PATENT DOCUMENTS

| 8,001,860 B1 | 8/2011 | Preston et al. |
| 8,471,691 B2 | 6/2013 | Zhang et al. |
| 8,502,860 B2 | 8/2013 | Demirdjian |
| 9,191,442 B2 | 11/2015 | Kuntagod et al. |
| 9,594,378 B2 | 3/2017 | Laur et al. |
| 9,733,093 B2 | 8/2017 | Denaro |
| 2012/0169526 A1* | 7/2012 | Reilhac ............ B60W 50/0098 342/70 |
| 2013/0321627 A1 | 12/2013 | Turn, Jr. et al. |

(Continued)

FOREIGN PATENT DOCUMENTS

WO    2016178190 A1    11/2016

OTHER PUBLICATIONS

Horatiu Boeriu "BMW showcasing 360-degree collision avoidance" Auto Shows, News http://www.bmwblog.com/2015/01/06/bmw-showcasing-360-degree-collision-avoidance/ pp. 1-9, Jan. 6, 2015.

(Continued)

*Primary Examiner* — Julie B Lieu
(74) *Attorney, Agent, or Firm* — Banner & Witcoff, Ltd.

(57) ABSTRACT

Systems and apparatuses for generating customized driving assistance outputs are provided. The system may collect initial sensor data from a rotating mobile device. The system may analyze the initial sensor data to determine whether to collect additional sensor data. Based on analysis of the initial sensor data and the additional sensor data, the system may determine a customized driving assistance output. The system may determine one or more notification outputs and one or more instruction outputs for the driver based on the customized driving assistance output. The system may update an aggregate driving output based on whether or not the instruction output was completed, as determined from subsequent sensor data.

20 Claims, 13 Drawing Sheets

(56) References Cited

U.S. PATENT DOCUMENTS

| | | |
|---|---|---|
| 2014/0149145 A1 | 5/2014 | Peng et al. |
| 2014/0244125 A1* | 8/2014 | Dorum .................. G01C 21/32 701/70 |
| 2015/0153184 A1 | 6/2015 | Mudalige et al. |
| 2016/0049079 A1* | 2/2016 | Ibrahim ................ G08G 1/005 340/944 |
| 2016/0091609 A1 | 3/2016 | Ismail et al. |
| 2016/0150070 A1* | 5/2016 | Goren .................. H04W 4/029 455/404.2 |
| 2016/0356623 A1 | 12/2016 | Matsumoto |
| 2017/0162053 A1 | 6/2017 | Margalef Valldeperez et al. |
| 2017/0174227 A1 | 6/2017 | Tatourian et al. |
| 2017/0174261 A1 | 6/2017 | Micks et al. |
| 2018/0041584 A1* | 2/2018 | Shannir .................. H04W 4/80 |
| 2018/0041628 A1* | 2/2018 | Shannir ............. H04M 1/72577 |
| 2018/0070388 A1* | 3/2018 | Maxwell ............... H04W 76/10 |
| 2018/0079359 A1* | 3/2018 | Park ...................... B60W 30/08 |
| 2019/0049914 A1* | 2/2019 | Munafo ............. G05B 19/0428 |

OTHER PUBLICATIONS

"Technology on XTS, ATS Can Help Avoid Crashes: Control and alert strategy assists drivers and can take action if needed" GM Corporate Newsroom https://media.gm.com/media/us/en/gm/news.detail.html/content/Pages/news/us/en/2012/Mar/0328_atsxts_safety.html pp. 1-5, Mar. 27, 2012.

"Mobile Eye: Our Technology" Mobile Eye an Intel Company https://www.mobileye.com/our-technology/ pp. 1-7 website visited Mar. 12, 2018.

"Machine Learning" Wikipedia https://en.wikipedia.org/wiki/Machine_learning pp. 1-14 website visited Mar. 12, 2018.

"Cycloramic" http://www.cycloramic.com/iPhone6/index_main.html pp. 1-6, website visited Mar. 12, 2018.

* cited by examiner

PROCESSING SYSTEM HAVING A MACHINE LEARNING ENGINE FOR PROVIDING A CUSTOMIZED DRIVING ASSISTANCE OUTPUT

FIELD OF ART

Aspects of the disclosure relate to processing systems. In particular, aspects of the disclosure relate to processing systems having a machine learning engine and machine learning datasets to generate customized driving assistance outputs.

BACKGROUND

Mobile devices comprise a plurality of sensors. Each interaction with a mobile device yields sensor data, associated with characteristics of a user and the user's surroundings. Users may not be aware of how best to protect themselves while driving. Accordingly, it would be advantageous to control the plurality of sensors with regard to timing of data collection, an amount of data collected, a type of data collected, and the like, and to aggregate the sensor data to generate customized driving assistance outputs. This may increase driver safety.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Methods, systems, and non-transitory computer-readable media are described herein. In some embodiments, a sensor data analysis and device control system including a processor may transmit, to a mobile device, an instruction to position the mobile device within a first vehicle. Further, the sensor data analysis and device control system may receive, from the mobile device, initial sensor data comprising sensor data around and within the first vehicle collected during or after the positioning. Next, the sensor data analysis and device control system may analyze, in real-time, the initial sensor data to identify a potential hazard. Additionally, the sensor data analysis and device control system may receive, after identifying the potential hazard and from the mobile device, additional sensor data associated with the potential hazard. Subsequently, the sensor data analysis and device control system may determine, based on the initial sensor data and the additional sensor data, a customized driving assistance output associated with the potential hazard. Further, the sensor data analysis and device control system may generate, based on the customized driving assistance output, a notification output comprising an indication of the potential hazard. Next, the sensor data analysis and device control system may generate, after generating the notification output, an instruction output comprising an instruction to modify a position or operation of the first vehicle responsive to the potential hazard. In addition, the sensor data analysis and device control system may transmit the notification output and the instruction output to the mobile device.

In some examples, the instruction to position the mobile device within the first vehicle may comprise an instruction to initiate rotation of the mobile device within the first vehicle.

In some instances, the initial sensor data may comprise at least one of: video sensor data, audio sensor data, vibration sensor data, and proximity sensor data.

In some examples, the sensor data analysis and device control system may receive data related to at least one of: a known route of the first vehicle, a risk map for the known route, weather information, and insurance information. Further, the sensor data analysis and device control system may analyze the data to identify an orientation for the mobile device. In addition, the sensor data analysis and device control system may transmit, to the mobile device, an instruction to modify a position of the mobile device to the identified orientation.

In some examples, the identifying the potential hazard may comprise identifying, during the receiving the initial sensor data, the potential hazard.

In some instances, the potential hazard may comprise at least one of: a pothole, an accident, a second vehicle, and an aggregate driving output of a driver of the second vehicle that is below a predetermined threshold value.

In some instances, the sensor data analysis and device control system may determine the aggregate driving output of the driver of the second vehicle by extracting data from a database comprising a plurality of aggregate driving outputs. Further, the sensor data analysis and device control system may transmit, to the mobile device and based on the aggregate driving output of the driver of the second vehicle, an instruction to capture additional images of the driver of the second vehicle.

In some instances, the plurality of aggregate driving outputs may comprise an aggregate driving output of a driver of the first vehicle.

In some instances, the sensor data analysis and device control system may receive a reaction of the driver of the first vehicle to the instruction output. Further, the sensor data analysis and device control system may update, responsive to receiving the reaction, the aggregate driving output of the driver of the first vehicle.

In some examples, the sensor data analysis and device control system may generate the notification output by generating, based on the historical data, a risk map. Further, the sensor data analysis and device control system may generate an indication of the potential hazard on the risk map. In addition, the sensor data analysis and device control system may transmit, to the mobile device, the risk map for display on the mobile device.

In some instances, the sensor data analysis and device control system may generate the notification output by generating an output to be displayed on one of a plurality of windows comprising the first vehicle, wherein the one of the plurality of windows is closer to the potential hazard than other windows comprising the plurality of windows. Further, the sensor data analysis and control system may transmit, to an operating system of the first vehicle, an instruction to display the notification output on the one of the plurality of windows.

In some examples, the instruction output may comprise one of: an instruction for a driver of the first vehicle to take an action responsive to the potential hazard or an instruction for an operating system of the first vehicle to cause the first vehicle to perform the action responsive to the potential hazard.

In some instances, the instruction output may comprise an instruction to change lanes.

In some examples, the mobile device may be mounted in a cradle and the instruction to position the mobile device may comprise instructing the mobile device to initiate rotation of the cradle.

In some instances, the instruction to position the mobile device comprises an instruction to initiate at least one of: horizontal rotation of the mobile device, vertical rotation of the mobile device, or a combination of horizontal and vertical rotations of the mobile device.

In some examples, the mobile device may comprise the sensor data analysis and device control system.

In some instances, the sensor data analysis and device control system may compare the customized driving assistance output to a predetermined driving assistance threshold. Next, the sensor data analysis and device control system may determine, based on the comparing, to generate the notification output.

In some examples, the sensor data analysis and device control system may analyze, in real time and after the generating the instruction output, the initial sensor data to identify a second potential hazard. Next, the sensor data analysis and device control system may receive, after the determining the second potential hazard and from the mobile device, second additional sensor data associated with the second potential hazard. Additionally, the sensor data analysis and device control system may determine, based on the initial sensor data and the second additional sensor data, a second customized driving assistance output associated with the second potential hazard. Subsequently, the sensor data analysis and device control system may determine that the second customized driving assistance output is below the predetermined driving assistance threshold. Further, the sensor data analysis and device control system may determine, based on the determination that the customized driving assistance output is below the predetermined driving assistance threshold, that a second notification output should not be generated.

The arrangements described may also include other additional elements, steps, computer-executable instructions, or computer-readable data structures. In this regard, other embodiments are disclosed and claimed herein as well. The details of these and other embodiments of the present disclosure are set forth in the accompanying drawings and the description below. Other features and advantages of the disclosure will be apparent from the description, drawings, and claims.

BRIEF DESCRIPTION OF THE DRAWINGS

The present disclosure is illustrated by way of example and is not limited by the accompanying figures in which like reference numerals indicate similar elements and in which.

DETAILED DESCRIPTION

Figure 1:
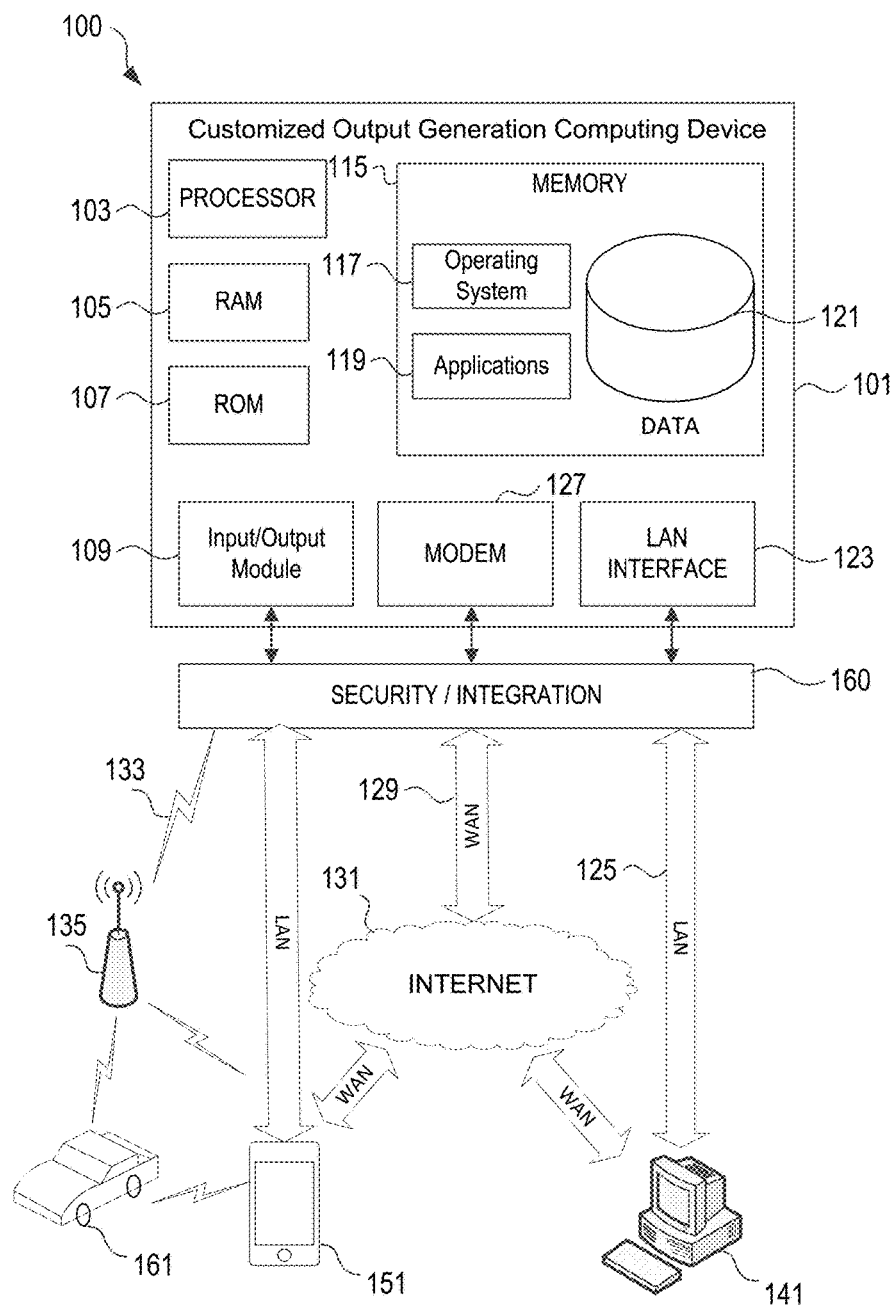
FIG. 1 shows a block diagram of one example customized output generation computing device (or system) in a computer system that may be used according to one or more illustrative embodiments of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing sensor data or events as described herein may be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to determining, based on sensor data collected via sensors comprising a driver's mobile device, a customized driving assistance output. A system may instruct the mobile device to position itself within a vehicle in response to the vehicle turning on, a command from the driver, expiration of a predetermined period of time, and the like. The system may be a component of or part of the mobile device (e.g., located within a same physical device) or the system may be a separate component from the mobile device (e.g., a separate or remotely located physical device from the mobile device). In response to the instructions, the mobile device may collect initial sensor data during or after the positioning. Based on the initial sensor data, the system may identify a potential hazard. Based on an analysis of the potential hazard, system may instruct the mobile device to collect additional sensor data associated with the potential hazard. The system may determine a customized driving assistance output based on the initial sensor data and the additional sensor data. The customized driving assistance output may in fact be a numeric output, or it may be a collection of sensor data all of which may be compared and weighted to determine severity of a potential driving hazard. The customized driving assistance output may be an absolute value, or may be a relative value as compared to a group. This group may be selected by the driver, and/or defined by a server. For example, the group may be selected based on age, geographic region, driving experience, and the like. The customized driving assistance output may be used to determine a notification output and an instruction output for the driver. For example, if the customized driving assistance output exceeds a predetermined driving assistance threshold, the system may instruct the mobile device to warn the driver and instruct them to take a preventative measure. If the customized driving assistance output does not exceed the predetermined driving assistance threshold, the system may not instruct the mobile device to warn or to instruct the driver. Based on whether or not the driver complies with the instruction output, an aggregate driving output associated with the driver may be adjusted. The aggregate driving output may reflect a safety level associated with the driver. The aggregate driving output may be used to adjust insurance rates and/or provide insurance incentives.

The customized driving assistance output may be determined using machine learning algorithms and machine learning datasets. Machine learning datasets may be generated based on sensor data (e.g., mobile device sensor data, vehicle sensor data, and the like) associated with the driver and other sensor data associated with other drivers. The drivers may comprise different characteristics. The machine learning datasets may also be generated based on a plurality of hazards and driving conditions associated with each of the plurality of hazards. A machine learning dataset may be selected based on driver characteristics, hazard type, driving conditions, and the like. The initial sensor data and the additional sensor data may be compared to the machine learning datasets to generate the customized driving assistance output.

These and various other arrangements will be described more fully herein.

FIG. 1 shows a block diagram of one example customized output generation computing device (or system) in a computer system 100 that may be used according to one or more illustrative embodiments of the disclosure. The customized output generation computing device 101 may have a processor 103 for controlling overall operation of the customized output generation computing device 101 and its associated components, including Random Access Memory (RAM) 105, Read Only Memory (ROM) 107, input/output module 109, and memory 115. The customized output generation computing device 101, along with one or more additional devices (e.g., terminals 141 and 151, security and integration hardware 160) may correspond to any of multiple systems or devices described herein, such as personal mobile devices, insurance systems servers, internal data sources, external data sources and other various devices. These various computing systems may be configured individually or in combination, as described herein, for receiving signals and/or transmissions from one or more computing devices.

Input/Output (I/O) 109 may include a microphone, keypad, touch screen, and/or stylus through which a user of the customized output generation computing device 101 may provide input, and may also include one or more of a speaker for providing audio output and a video display device for providing textual, audiovisual and/or graphical output. Software may be stored within memory 115 and/or storage to provide instructions to processor 103 for enabling the customized output generation computing device 101 to perform various actions. For example, memory 115 may store software used by the customized output generation computing device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a customized output generation computing device 101 (e.g., a personal mobile device, etc.), in order to receive and analyze the signals, transmissions, etc. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the customized output generation computing device 101 to execute a series of computer-readable instructions, for example, receive sensor data associated with a driving scenario, generate a customized driving assistance output, and offer notification outputs and instruction outputs to the driver based on the sensor data and the customized driving assistance output.

The computing device (e.g., a personal mobile device, insurance system server, etc.) may operate in a networked environment 100 supporting connections to one or more remote computers, such as terminals 141, 151, and 161. Such terminals may be personal computers or servers 141 (e.g., home computers, laptops, web servers, database servers), mobile communication devices 151 (e.g., mobile phones, tablet computers, etc.), and the like, each of which may include some or all of the elements described above with respect to the customized output generation computing device 101. The network connections depicted in FIG. 1 include a local area network (LAN) 125 and a wide area network (WAN) 129, and a wireless telecommunications network 133, but may also include other networks. When used in a LAN networking environment, the customized output generation computing device 101 may be connected to the LAN 125 through a network interface or adapter 123. When used in a WAN networking environment, the customized output generation computing device 101 may include a modem 127 or other means for establishing communications over the WAN 129, such as network 131 (e.g., the Internet). When used in a wireless telecommunications network 133, the customized output generation computing device 101 may include one or more transceivers, digital signal processors, and additional circuitry and software for communicating with wireless computing devices 151 and 161 (e.g., mobile phones, portable user computing devices, etc.) via one or more network devices 135 (e.g., base transceiver stations) in the wireless network 133.

Also illustrated in FIG. 1 is a security and integration layer 160, through which communications are sent and managed between the customized output generation computing device 101 (e.g., a personal mobile device, an intermediary server and/or external data source servers, etc.) and the remote devices (141, 151, and 161) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the customized output generation computing device 101. As an example, a security and integration layer 160 of the customized output generation computing device 101 may comprise a set of web application servers configured to use secure protocols and to insulate the customized output generation computing device 101 from external devices 141, 151, and 161. In some cases, the security and integration layer 160 may correspond to a set of dedicated hardware and/or software operating at the same physical location and under the control of same entities as the customized output generation computing device 101. For example, layer 160 may correspond to one or more dedicated web servers and network hardware. In other examples, the security and integration layer 160 may correspond to separate hardware and software components which may be operated at a separate physical location and/or by a separate entity.

As discussed below, the data transferred to and from various devices in a system 100 may include secure and sensitive data, such as insurance policy data, and confidential user data. Therefore, it may be desirable to protect transmissions of such data by using secure network protocols and encryption, and also to protect the integrity of the data when stored on the various devices within a system, such as personal mobile devices, insurance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices in the system 100 and/or the security and integration layer 160. The web services may be accessed by authorized external devices and users to support input, extraction, and manipulation of the data between the various devices in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, data may be implemented in the security and integration layer 160 using the Secure Sockets Layer (SSL) or Transport Layer Security (TLS) protocol to provide secure connections between the customized output generation computing device 101 and various clients 141, 151, and 161. SSL or TLS may use HTTP or HTTPS to provide authentication and confidentiality. In other examples, such web services may be implemented using the WS-Security standard, which provides for secure SOAP messages using Extensible Markup Language (XML) encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data, such as sensor data, or other types of data from or write data to the CPU cache rather than reading/writing to memory 115, which may improve the speed of these operations. In some examples, a database cache may be created in which certain data from a database 121 is cached in a separate smaller database on an application server separate from the database server (e.g., at a personal mobile device or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations, such as faster response times and less dependence on network conditions when transmitting and receiving driver information, vehicle information, location information, and the like.

It will be appreciated that the network connections shown are illustrative and other means of establishing a communications link between the computers may be used. The existence of any of various network protocols such as Transmission Control Protocol (TCP)/Internet Protocol (IP), Ethernet, FTP, HTTP and the like, and of various wireless communication technologies such as Global System for Mobile Communication (GSM), Code Division Multiple Access (CDMA), WiFi, and WiMAX, is presumed, and the various computing devices described herein may be configured to communicate using any of these network protocols or technologies.

Additionally, one or more application programs 119 may be used by the various computing devices, including computer executable instructions for receiving and analyzing various signals or transmissions. In some examples, the one or more application programs 119 may be downloaded or otherwise provided to a device (e.g., from a central server or other device) and may execute on the device.

Figure 2:
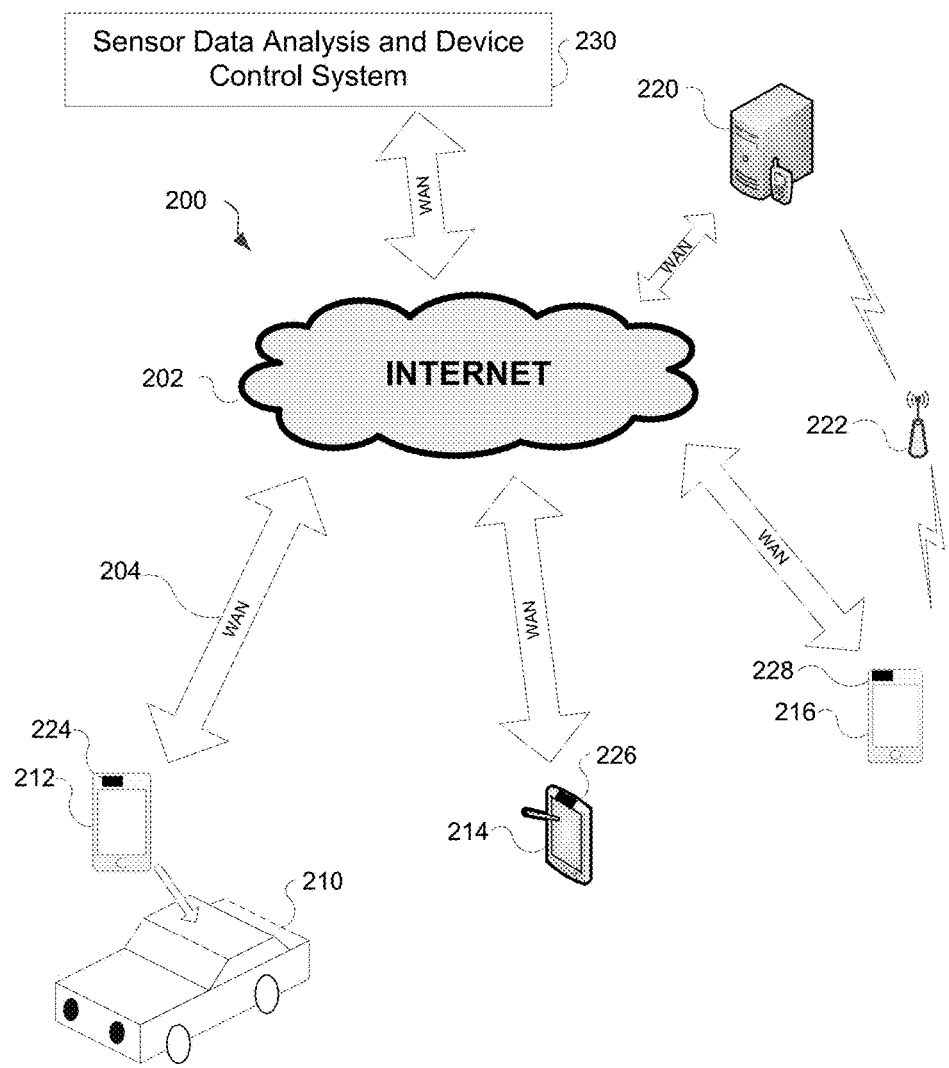
FIG. 2 shows a block diagram of a WAN networking environment, including a network 202 (e.g., the Internet) or other means for establishing communications over the WAN network 204 in accordance with one or more aspects described herein.

FIG. 2 shows a block diagram of a WAN networking environment 200, including a network 202 (e.g., the Internet) or other means for establishing communications over the WAN network 204 in accordance with one or more aspects described herein. The network 202 may be any type of network and may use one or more communication protocols (e.g., protocols for the Internet (IP), Bluetooth, cellular communications, satellite communications, and the like) to connect computing devices and servers within the networking environment 200 so they may send and receive communications between each other. In particular, the network 202 may include a cellular network and its components, such as cell towers. Accordingly, for example, a mobile device 212 (e.g., a smartphone) of a driver associated with vehicle 210 may communicate, via a cellular backhaul of the network 202, with another mobile device, e.g., tablet 214, smartphone 216.

The mobile devices 212, 214, 216 may communicate back and forth over the Internet, such as through a server 220. When used in a WAN networking environment 200, the server 220 may include one or more transceivers, digital signal processors, and additional circuitry and software for communicating with wireless mobile devices (e.g., smart phone 216) via one or more network devices 222 (e.g., base transceiver stations) in the wireless network.

The network 202 may include a sensor data analysis and device control system 230. The sensor data analysis and device control system 230 may comprise a part of the mobile devices 212, 214, 216, or the sensor data analysis and device control system 230 may be separate from the mobile devices 212, 214, 216. For example, the sensor data analysis and device control system 230 may comprise a part of an insurance system server, the server 220, and the like. The sensor data analysis and device control system 230 may instruct a device, such as a mobile device 212, 214, 216 to collect sensor data, may control one or more aspects of the data collection, and may then implement machine learning algorithms and machine learning datasets to analyze the collected sensor data. For example, the sensor data analysis and control system 230 may control operations of one of the mobile devices 212, 214, 216.

Mobile devices 212, 214, 216 may be, for example, mobile phones, personal digital assistants (PDAs), tablet computers, smartwatches, and other devices that may be carried by drivers inside or outside of the vehicle 210. The mobile devices 212, 214, and 216 may comprise the sensors 224, 226, 228 respectively. The sensors 224, 226, 228 may comprise motion sensors (accelerometers, speedometers, compasses, gyroscopes, and/or global positioning system (GPS) receivers, and the like, acoustic sensors (microphones and the like), vibration sensors (seismometers and the like), environmental sensors, temperature sensors (thermometers and the like), light sensors, and the like. The sensors 224, 226, 228 may comprise certain sensors that may collect and analyze sensor data over time, for example, cameras, proximity sensors, and various wireless network interfaces capable of detect access to different data networks, mobile networks, and other mobile devices (e.g., via Bluetooth). The mobile devices 212, 214, 216 may use the sensors 224, 226, 228 respectively to collect sensor data such as position, distance, speed, acceleration, orientation, speech, weather patterns, moisture, humidity, temperature, amount of light, and the like. The sensors 224, 226, 228 may comprise the same or different types of sensors. Furthermore, GPS receivers may optionally be integrated into any of the mobile devices 212, 214, 216.

The mobile devices 212, 214, 216 may be a user device as described above (e.g., a smartphone, personal digital assistant, or tablet computer, etc.), and also may include a vehicle interface component to allow the mobile device to establish communication with an on-board vehicle system. For example, either the mobile device 212, 214, 216 or a vehicle 210 may be implemented with hardware (e.g., an input port or docking station) and/or software (e.g., network interfaces, secure protocols and encryption, etc.), and may be designed and configured to establish communication (using a wired or wireless connection) between the mobile devices 212, 214, 216 and an on-board vehicle system. For example, a smartphone or tablet computer, which is often carried by a user, may include an on-board vehicle system interface to detect and/or connect to an on-board vehicle system whenever the user is driving (and/or riding as a passenger) in a vehicle. After a mobile device 212, 214, 216 establishes communication with an on-board vehicle system, which may be a telematics device, on-board diagnostic system, vehicle navigation device, or other vehicle computer system, the mobile device 212, 214, 216 may receive vehicle sensor data (e.g., acceleration data) collected by various vehicle sensors. Thus, non-vehicle based mobile devices (e.g., smartphones or tablet computers) may use vehicle interfaces to receive some or all of the same vehicle sensor data and driving data that is accessible to on-board vehicle systems, discussed below.

Vehicle 210 may be, for example, an automobile, truck, motorcycle, scooter, bus, recreational vehicle, boat, or other vehicle for which sensor data may be collected and analyzed by the mobile device. The vehicle 210 may comprise one or more vehicle sensors such as the sensor 230. For example, the sensor 230 may communicate with a telematics device, vehicle computer, and/or on-board diagnostics systems. The vehicle sensors may comprise, movement sensors including hardware and/or software components configured to detect vehicle driving data. For example, the vehicle sensors may detect and store sensor data corresponding to the vehicle's speed, distances driven, rates of acceleration or braking, and specific instances of sudden acceleration, braking, and swerving. The vehicle sensors also may detect and store sensor data received from the vehicle's internal systems, such as headlight usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other sensor data collected by the vehicle's computer systems. Additional vehicle sensors may detect and store sensor data relating to the maintenance of the vehicle, such as the engine status, oil level, engine coolant temperature, odometer reading, the level of fuel in the fuel tank, the level of charge in the battery (e.g., for hybrid or electric cars), engine revolutions per minute (RPMs), and/or tire pressure. Certain vehicles also may include cameras and/or proximity sensors capable of recording conditions inside or outside of the vehicle, as well as sensors configured to collect sensor data associated with a driver's movements or the condition of a driver, for example, sensors that monitor a driver's movements, such as the driver's eye position and/or head position, etc. Additional safety or guidance-assistance features may be included in some vehicles, detecting and storing sensor data such as lane departures, adaptive cruise control activation, blind spot detector activation, etc.

Figure 3:
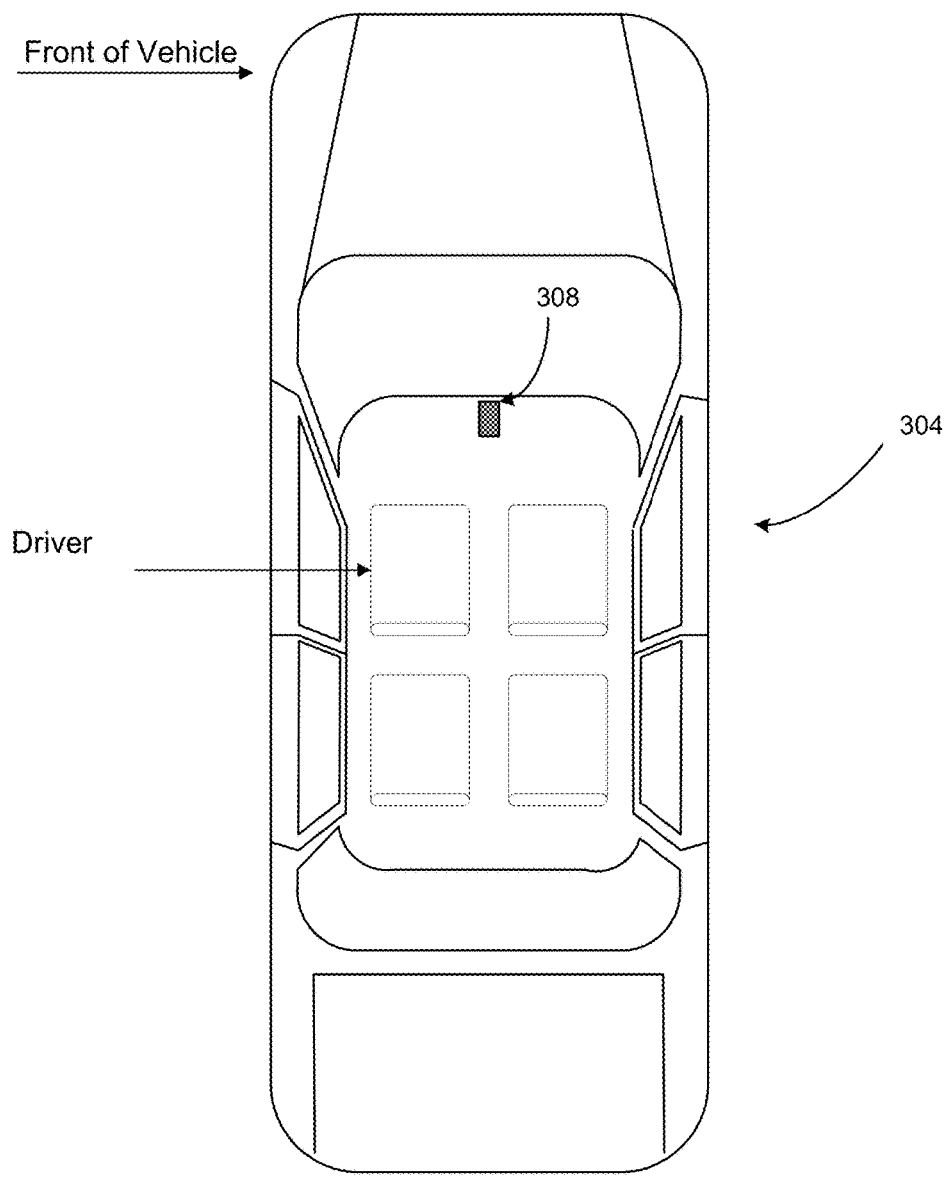
FIG. 3 shows an example mobile device located within a vehicle in accordance with one or more aspects described herein.

FIG. 3 shows an example mobile device located within a vehicle in accordance with one or more aspects described herein. The mobile device 308 may comprise a cell phone, smart phone, etc. of a driver of the vehicle 304. In some arrangements, the mobile device 308 may be attached or connected to a dashboard in the vehicle 304. For example, the mobile device 308 may be attached or connected to the dashboard via a cradle as described with regard to FIG. 4B. Alternatively, the mobile device 308 may be positioned on the dashboard without any additional device to connect or attach the mobile device 308 to the dashboard as described with regard to FIG. 4A.

In some examples, the mobile device 308 may be positioned on a front windshield, rear windshield, one or more side windows, or the like, of the vehicle. In some examples, the mobile device 308 may be positioned at a top of a front windshield in the vehicle 304. In other examples, the mobile device 308 may be positioned at any other location on the front windshield of the vehicle 304 or on the dashboard of the vehicle 304. In some arrangements, the height, position, or the like, of the mobile device 308 may affect data that may be collected. For example, the mobile device may collect more data if it is positioned on the dashboard or low on the windshield than if the mobile device is placed at the top of the windshield.

Figure 4:
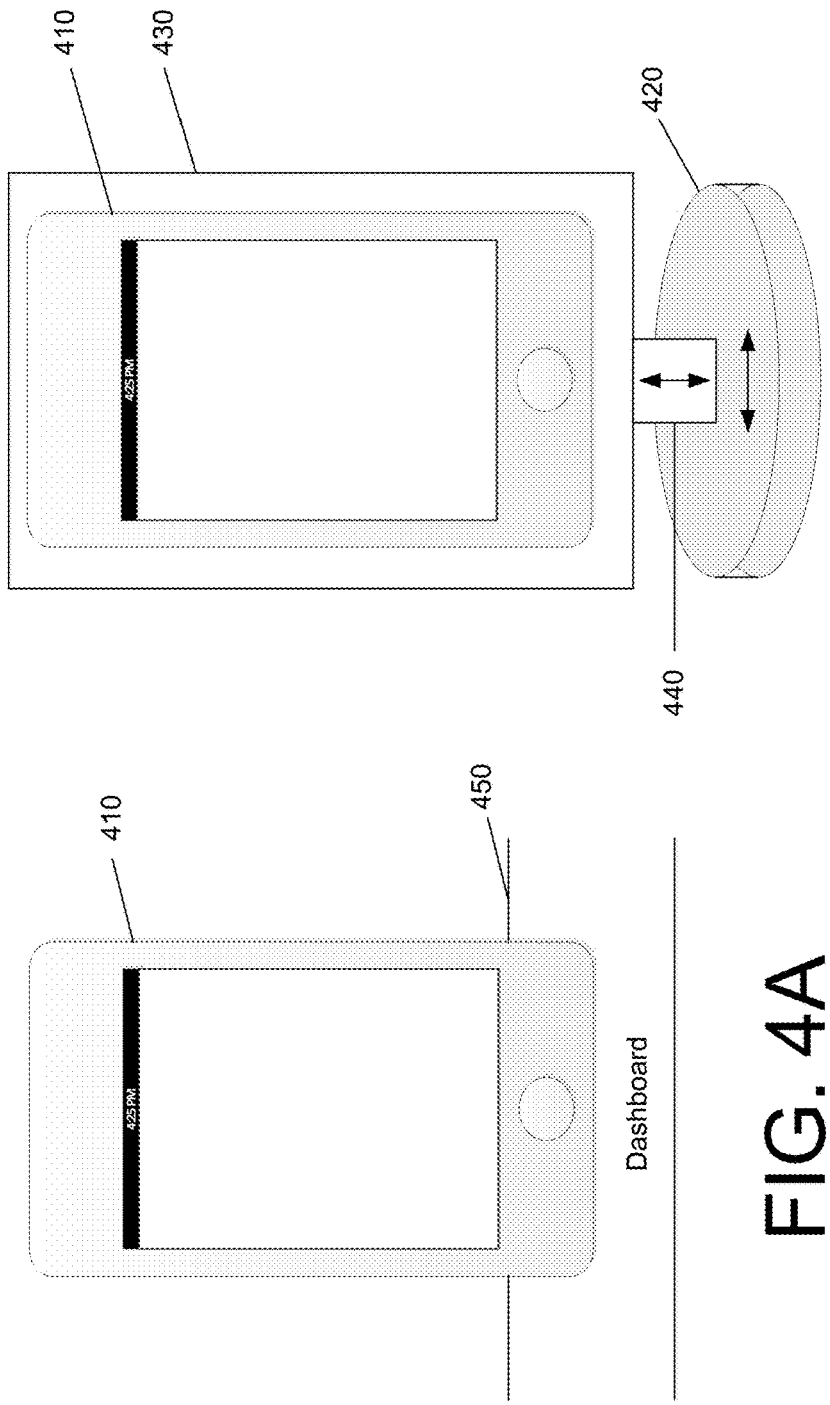
FIG. 4A illustrates a first example of a mobile device positioned inside a vehicle in accordance with one or more aspects described herein.
FIG. 4B illustrates a second example of a mobile device positioned inside a vehicle in accordance with one or more aspects described herein.

FIG. 4A illustrates a first example of a mobile device positioned inside a vehicle in accordance with one or more aspects described herein. In this example, mobile device 410 may rest on a dashboard 450 of the vehicle without a cradle or other device to connect or attach the mobile device to the dashboard 450. The mobile device 410 may comprise a plurality of sensors, as described above with regard to FIG. 2. The mobile device 410 may be positioned within the vehicle based on an instruction, such as an instruction from the sensor data analysis and device control system 230. In some arrangements, the mobile device 410 may rotate to collect data via the sensors (e.g., in addition to sensor data collected when the mobile device is stationary or non-rotating). For example, the mobile device 410 may stand vertically or horizontally on the dashboard 450 and may conduct vibration-induced rotation to rotate the mobile device 410 for collection of the sensor data. The mobile device 410 may also comprise one or more cameras. In some examples, the mobile device 410 may include a rearward facing camera (e.g., configured to capture images from a rear (e.g., non-display) side of the mobile device 410) and a forward facing camera (e.g., configured to capture images from a front (e.g., display side) of the mobile device 410). This may allow the mobile device 410 to capture images from multiple angles without performing a full rotation. A system, such as the sensor data analysis and device control system 230, may control operation of the cameras. For example, the system 230 may cause (e.g., transmit an instruction, command, signal or the like controlling the mobile device) one or more of the cameras to capture images at particular times and may cause the cameras to capture a images in a particular mode (e.g., black and white, color, panoramic, video, still images, high definition, a particular zoom, and the like).

FIG. 4B illustrates a second example of a mobile device positioned inside a vehicle in accordance with one or more aspects described herein. In this example, the mobile device 410 may be positioned in a cradle 430 or other device on a dashboard of the vehicle or a windshield of the vehicle. The cradle 430 may comprise a base 420 and a stem 440. The base 420 may allow the cradle 430 to perform a full rotation (e.g., rotate 360° in either direction). The base 420 may also allow the cradle 430 to perform a partial rotation (e.g., rotate less than 360° in either direction). The stem 440 may allow the cradle 430 to extend or retract. For example, the stem 440 may be extendable, allowing the cradle 430 to raise the mobile device 410 to one or more different heights for additional sensor data collection. In some examples, the stem 440 may be telescoping to allow for varying heights. In still other examples, the stem 440 may include one or more stops to permit securing the mobile device 410 in one or more preset positions along the stem.

The stem 440 may also be used to lower the mobile device 410. For example, after the mobile device 410 captured additional sensor data at the different height, the mobile device 410 may return to an original height via retraction of the stem 440. In addition to allowing the cradle 430 to extend and to retract, the stem 440 may allow the cradle to alter an angle of the mobile device 410. For example, the stem 440 may adjust a line of sight of the mobile device 410 by causing the mobile device 410 to lean forward or backward. For example, the stem 440 may enable repositioning of the mobile device 410 45° forward or 45° backward. This may afford the mobile device 410 an additional range of motion for collecting data. Although shown in FIG. 4B, the cradle 430 is merely one example device for securing the mobile device 410 to the vehicle and it should be understood to one skilled in the art that any device that may hold a mobile device and simultaneously allow for a full range of motion based on sensor data from the mobile device may be used. These rotations, extensions, and movements of the cradle 430 and the mobile device 410 may be performed automatically and without user interaction (e.g., based on instructions received from system 230).

Figure 5:
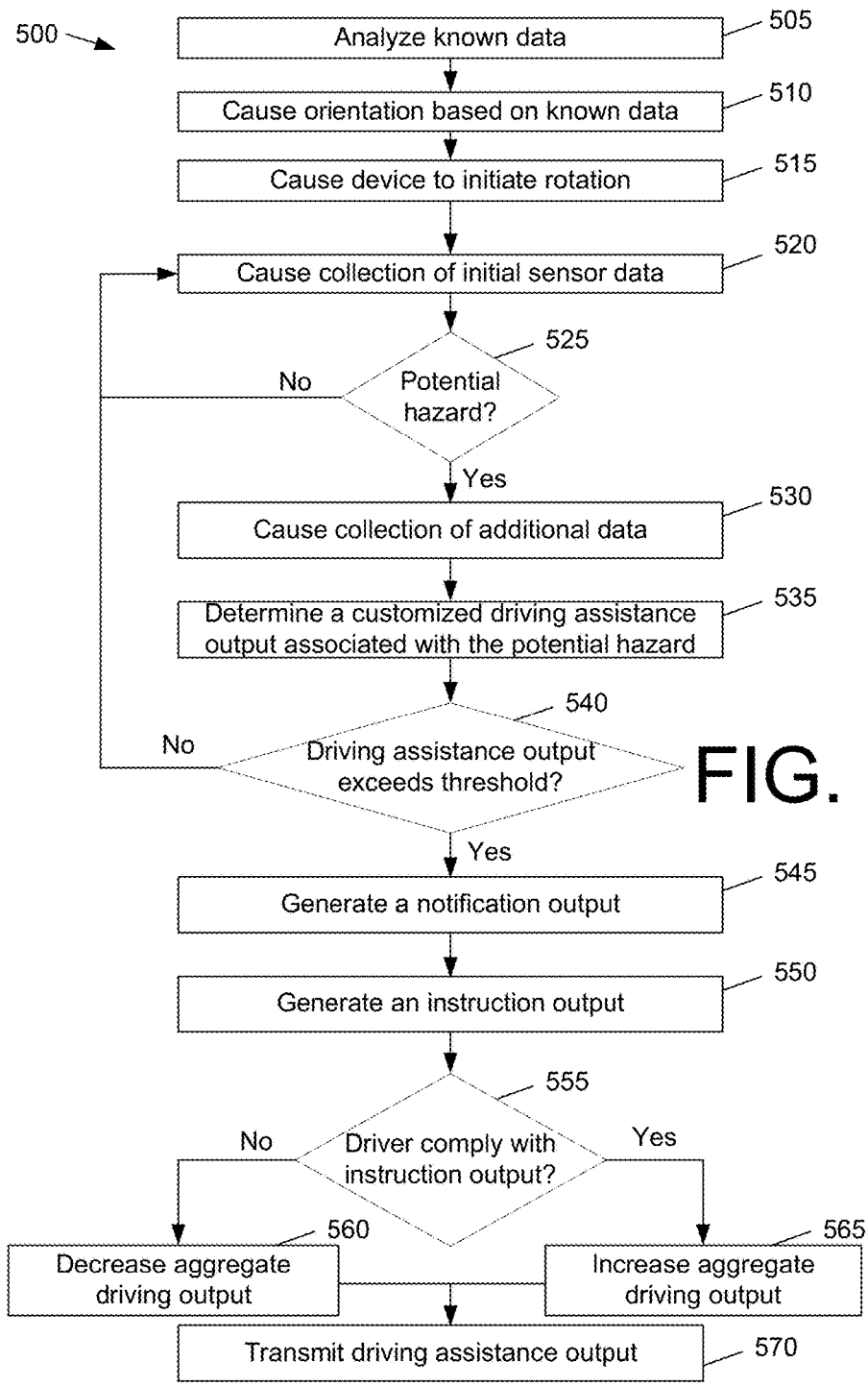
FIG. 5 is a flow diagram illustrating an example method for determining a customized driving assistance output in accordance with one or more aspects described herein.

FIG. 5 is a flow diagram illustrating an example method for determining a customized driving assistance output in accordance with one or more aspects described herein. The method 500 or one or more steps thereof may be performed by one or more computing devices or entities. For example, portions of the method 500 may be performed by components of the system 100, the WAN networking environment 200, or the sensor data analysis and device control system 230. The method 500 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The customized driving assistance output may be determined based on information received from a plurality of sensors comprising a mobile device associated with a user. The customized driving assistance output may be used to warn the user, as well as other drivers, of a potential driving hazard.

At step 505, a system, such as the sensor data analysis and device control system 230, may receive and analyze known sensor data. For example, known sensor data may comprise sensor data stored at a central database, such as an insurance system server. The known sensor data may also comprise publicly available sensor data associated with a mobile application, such as one or more weather applications, traffic applications, map applications, and the like. The known sensor data may comprise, for example, a known route of the vehicle, a risk map for the known route, weather information, insurance information, and the like. For example, based on the known route, the system 230 may determine that the vehicle is approaching a tight curve. Thus, the system 230 may cause (e.g., transmit an instruction, command, signal or the like controlling the mobile device) the mobile device to orient itself towards the curve. This may improve sensor data collection, as opposed to merely starting at the same heading for every rotation and performing a clockwise rotation. Additionally, insurance information may reflect that a large amount of accidents occur in a certain location, potentially due to a blind turn. In this example, the system 230 may cause (e.g., by transmitting an instruction, signal, command, or the like) the mobile device to orient itself towards the blind turn. The system 230 may cause the mobile device to generate a risk map based on the known sensor data. For example, the risk map may show that accidents often occur in a nearby location. The system 230 may cause the mobile device to display the risk map.

At step 510, the system 230 may cause the mobile device (e.g., transmit an instruction, command, signal or the like controlling the mobile device) to orient itself based on the known sensor data. For example, the system 230 may determine if a particular orientation may improve hazard detection to a degree that exceeds a predetermined orientation threshold. For example, the system 230 may cause the mobile device to orient itself towards a tight curve if such orientation may improve hazard detection to a degree that exceeds the predetermined orientation threshold. In another example, the system 230 may cause the mobile device to orient itself towards a blind turn if such orientation may improve the hazard detection to a degree that exceeds the predetermined orientation threshold. If no orientation would improve hazard detection to a degree that exceeds the predetermined orientation threshold, the system 230 may cause the mobile device to orient towards the front of the vehicle. As an alternative, a driver may preset an initial orientation for the mobile device. For example, the preset initial orientation may be facing the driver. In another example, the driver may request an orientation. For example, the driver may use a voice command to request the system 230 to cause the mobile device to orient itself towards the left rear of the vehicle.

At step 515, the system 230 may cause (e.g., transmit an instruction, command, signal or the like controlling the mobile device) the mobile device to initiate rotation. As described above with regard to FIGS. 4A and 4B, in response to an instruction from the system 230, the mobile device may rotate on its own, or the mobile device may be placed in a cradle that causes the mobile device to rotate.

The system 230 may cause the mobile device to initiate rotation in response to a determination that a vehicle has been started. For example, the system 230 may cause the mobile device to sync with the vehicle (e.g., via Bluetooth), and may determine that the ignition has started. Additionally, the system 230 may determine, using sensor data, that the vehicle has started. For example, the system 230 may determine, based on data from a vibration sensor comprising the mobile device, a motion sensor comprising the mobile device, and the like to determine that the vehicle has started. The system 230 may also cause the mobile device to initiate rotation in response to a user input. For example, a user may instruct the mobile device, via a voice command, to initiate rotation. In response to the instruction, the system 230 may cause the mobile device to initiate rotation. The system 230 may cause the mobile device to conduct rotations at predetermined intervals. For example, the system 230 may cause the mobile device to make a rotation every two minutes to scan for potential hazards. The system 230 may determine the predetermined intervals, for example, based on a speed of the vehicle, an amount of traffic congestion, a time of day, whether the vehicle is in the city or a rural setting, and the like. The system 230 may determine the predetermined intervals using machine learning algorithms and machine learning datasets. For example, the system 230 may determine, using machine learning algorithms and machine learning datasets, different predetermined intervals for various pluralities of driving conditions. Then the system 230 may compare current driving conditions to the various pluralities of driving conditions to determine an appropriate predetermined interval.

The system 230 may also cause (e.g., transmit an instruction, command, signal or the like controlling the mobile device) the mobile device to initiate rotation in response to a determination that the mobile device has been oriented. The rotation may be horizontal rotation, vertical rotation, or a combination of horizontal and vertical rotations. The combination of horizontal and vertical rotations may comprise horizontal and vertical rotations occurring one after the other, or simultaneous horizontal and vertical rotations. The system 230 may cause the mobile device to rotate at a predetermined speed set by the driver. A default rotation for the mobile device may also be set by the driver. For example, the default rotation may comprise a clockwise rotation. The rotation may comprise a full 360° rotation.

At step 520, the system 230 may cause the mobile device to collect initial sensor data. The system 230 may cause the mobile device to collect the initial sensor data during the rotation initiated at step 515. The initial sensor data may comprise at least one of: video sensor data, audio sensor data, vibration sensor data, and proximity sensor data. For example, the system 230 may cause the mobile device to collect video data comprising the vehicle's surroundings. The system 230 may also sync with operational systems of the vehicle. This may allow the system 230 to collect the initial sensor data from on-board sensors. During the initial rotation, the system 230 may cause the mobile device to collect the initial sensor data from all sides of the vehicle, as well as the interior of the vehicle. For example, the initial sensor data may comprise data associated with the driver's line of sight, body language, fatigue measurement, and the like.

At step 525, the system 230 may determine if the initial sensor data and the known sensor data reflect a potential hazard. For example, the system 230 may determine, based on the initial sensor data, that the vehicle is approaching a pothole. The system 230 may proceed to step 530 and cause (e.g., transmit an instruction, command, signal or the like controlling the mobile device) the mobile device to collect additional sensor data associated with the pothole, such as the size. As another example, the system 230 may determine, based on the initial sensor data, that another vehicle is driving nearby. In this example, the system 230 may proceed to step 530 to cause the mobile device to collect additional sensor data associated with the other vehicle, such as a level of noise, a number of passengers, and additional video data associated with the other vehicle. If the system 230 does not determine that there is a potential hazard, the system 230 may cause the mobile device to continue to rotate and to collect initial sensor data. Other potential hazards may include, for example, pedestrians, cyclists, and the like.

At step 530, the system 230 may cause (e.g., transmit an instruction, command, signal or the like controlling the mobile device) the mobile device to collect additional sensor data associated with the potential hazard. For example, as described at step 525, the system 230 may determine the potential hazard and, in response, may transmit an instruction of a command to initiate collection of additional data by activating sensors in the mobile device. The additional sensor data may comprise at least one of accelerometer data, speedometer data, compass data, gyroscope data, global positioning system (GPS) data, microphone data, seismometer data, environmental sensor data, thermometer data, light sensor data, and the like. For example, the system 230 may cause the mobile device to determine additional sensor data associated with the pothole. For example, the system 230 may cause a camera comprising the mobile device to capture images or video to determine a size of the pothole. In another example, the system 230 may cause sensors comprising the mobile device to determine additional sensor data associated with the other vehicle. For example, the system 230 may use audio sensors comprising the mobile device to determine a level of noise emanating from the other vehicle. In addition, the system 230 may cause a camera comprising the mobile device to capture images and video of the other vehicle. The system 230 may then determine, for example, a number of passengers in the other vehicle, if the other vehicle is swerving, or if the other driver is not paying attention (shaving, talking on the phone, eating, smoking, hands off the wheel, not watching the road and the like). The system 230 may cause the camera comprising mobile device to capture an image of a license plate of the other vehicle. The system 230 may then compare a license plate identification of the other vehicle against a historical database and determine a personalized driving output that reflects a risk associated with the other driver. For example, the historical database may comprise data indicating previous insurance claims.

At step 535, the system 230 may determine, based on the known sensor data, the initial sensor data, and the additional sensor data, a customized driving assistance output associated with the hazard. For example, the customized driving assistance output may comprise a numeric value that quantifies a risk associated with the hazard. The system 230 may use the customized driving assistance output to determine whether to cause (e.g., transmit an instruction, command, signal or the like controlling the mobile device) the mobile device to notify the driver of the hazard. The system 230 may determine the customized driving assistance output via, for example, machine learning algorithms and machine learning datasets. For example, the system 230 may access a historical database comprising a plurality of hazards and previously determined customized driving assistance outputs associated with the plurality of hazards. The historical database may take numerous factors into account, in addition to the hazard itself, such as an aggregate driving output associated with the driver, aggregate driving outputs associated with drivers of other nearby vehicles, a time, weather conditions, vehicle operating conditions, vehicle age, a driver's vision, a driver's age, a driver's experience, insurance information, distance traveled since the vehicle was turned on, distance since a last stop, speed, geographic location, and the like. For example, under identical driving circumstances, two different drivers may receive different customized driving assistance outputs associated with the same hazard. Using the machine learning algorithms and machine learning datasets, the system 230 may determine a customized driving assistance output based on sensor data for each hazard. The use of machine learning algorithms and machine learning datasets is further described below with regard to FIG. 6.

At step 540, the system 230 may determine whether the driving assistance output determined at step 535 exceeds a predetermined driving assistance threshold. If the customized driving assistance output does not exceed the predetermined driving assistance threshold, the system 230 may determine that a risk associated with the hazard is minimal, and that it is not worth providing further driving assistance with regard to the hazard. In this example, the system 230 may return to step 520 to cause (e.g., transmit an instruction, command, signal or the like controlling the mobile device) the mobile device to resume rotation and to collect more initial sensor data. For example, the system 230 may determine, based the additional sensor data collected at step 530, that the customized driving assistance output associated with the pothole does not exceed the predetermined hazard threshold. As a result, the system 230 may return to step 520 to cause the mobile device to resume rotation and collection of initial sensor data, in some examples, without warning the driver of the hazard. If the customized driving assistance output does exceed the predetermined driving assistance threshold, the system 230 may determine that there is a large risk associated with the hazard, and may proceed to step 545 to generate a warning for the driver. For example, the system 230 may determine, based on the additional sensor data collected at step 530, that the other vehicle, identified as a potential hazard at step 525, is swerving nearby on the road. The system 230 may determine that the customized driving assistance output associated with other vehicle exceeds the predetermined driving assistance threshold. In this example, the system 230 may proceed to step 545 to generate a notification output.

At step 545, the system 230 may generate the notification output, which may comprise a warning of the hazard. For example, based on the determination at step 540 that customized driving assistance output associated with the hazard exceeds the predetermined driving assistance threshold, the system 230 may generate the notification output and may cause (e.g., transmit an instruction, command, signal or the like controlling the mobile device) the mobile device to display the notification output. The notification output may comprise a risk map on the display of the mobile device. For example, as described below with regard to FIG. 10, the system 230 may cause the mobile device to display the vehicle and a red dot at the location of the hazard. In another example, as described further below with regard to FIG. 12, the notification output may comprise text displayed on the display of the mobile device. For example, the mobile device may display the text "Large Pothole Ahead." In another example, the system 230 may cause illumination of a window of the vehicle closest to the hazard. For example, another vehicle may be approaching from the right rear, and thus the system 230 may cause illumination of the right rear window with a red glow. In this example, the system 230 may communicate (e.g., transmit an instruction, command, signal or the like controlling onboard vehicle sensors) with the onboard vehicle sensors in the vehicle. In response to the communication, the onboard vehicle sensors may cause the illumination. In yet another example, the system 230 may cause display of a risk map on a windshield of the vehicle. For example, the system 230 may cause display of a windshield overlay that shows another vehicle approaching to the right. The system 230 may cause a projection by the mobile device, or the system 230 may cause the projection by the onboard vehicle sensors. The onboard vehicle sensors may cause display, in response to the communication from the system 230, of the risk map.

In addition to warning the driver of the hazard via the notification output, the system 230 may warn the operating systems of the vehicle itself. For example, the vehicle may be on autopilot or may be an autonomous vehicle. In this example, the system 230 may warn the operating systems of the vehicle in addition to, or as an alternative to, the driver. For example, the notification output may comprise a command to the vehicle.

At step 550, after display of the notification output, the system 230 may generate an instruction output. The instruction output may comprise a recommendation of how to avoid the hazard. The instruction output may comprise an instruction to modify a position of a vehicle or operation of the vehicle responsive to the hazard. The system 230 may cause (e.g., transmit an instruction, command, signal or the like controlling the mobile device) the mobile device to communicate the instruction output to the driver. For example, as described below with regard to FIG. 12, the system 230 may generate an audio output instructing the driver to merge to the left or to pay particular attention. The instruction output may also comprise an instruction to the operating systems of the vehicle itself. For example, the instruction output may comprise an instruction for the operating systems to cause the vehicle to change lanes autonomously. For example, the instruction output may comprise a command to the vehicle operating systems. The command may comprise a command to merge the vehicle.

At step 555, the system 230 may determine whether the driver complied with the instruction output. For example, the system 230 may have instructed the driver to change lanes at step 550. The system 230 may continue to collect post-instruction sensor data and may determine based on the post-instruction sensor data whether the driver complied with the instruction output. In addition, the driver may provide an input indicating compliance with the instruction output or lack thereof. For example, the driver may provide a voice command to the system 230, indicating the instruction output may be ignored. If the system 230 determines that the driver did not comply with the instruction output, the system 230 may proceed to step 560 and may decrease the aggregate driving output associated with the driver. If the system 230 determines that the driver did comply with the instruction output, the system 230 may proceed to step 565 and may increase the aggregate driving output associated with the driver. For example, the aggregate driving output may comprise a numeric value that may be used to determine appropriate insurance rates and insurance incentives for a driver.

At step 560, the system 230 may decrease the aggregate driving output associated with the driver. For example, based on the failure to comply with the instruction output, the system 230 may determine that the driver comprises an increased risk on the road. Having a decreased aggregate driving output may cause the driver to face increased insurance costs. In addition to decreasing the aggregate driving output associated with the driver, if the hazard comprised another vehicle, the system 230 may decrease an aggregate driving output associated with the driver of the other vehicle. For example, the system 230 may cross reference, in a stored database, a license plate number associated with the other vehicle. In doing so, the system 230 may determine the aggregate driving output associated with the driver of the other vehicle, and may adjust the aggregate driving output accordingly. In one example, the system 230 may determine, based on the stored database, that multiple drivers use the other vehicle. In this example, in addition to cross referencing the license plate number, the system 230 may perform facial recognition on the driver of the other vehicle. This may allow the system 230 to distinguish between multiple drivers of the other vehicle, and to adjust the appropriate aggregate driving output.

At step 565, the system 230 may increase the aggregate driving output associated with the driver. For example, based on the successful completion of the instruction output, the system 230 may determine that the driver comprises a smaller risk on the road. Having an increased personalized driving output may cause the driver to receive insurance discounts and insurance incentives.

At step 570, the system 230 may transmit the driving assistance output. For example, the system 230 may upload, to a shared server, the driving assistance output. Systems comprising mobile devices of other nearby drivers may generate notification outputs, and may cause (e.g., transmit an instruction, command, signal or the like controlling the mobile device) the mobile devices to display the notification outputs to the other nearby drivers. This may allow these other systems to warn the other nearby drivers of the potential hazard.

After transmitting the driving assistance output, the mobile device may return to step 505 and restart the method 500.

Although steps 505-570 are shown in an exemplary order in FIG. 5, steps 505-570 need not all be performed in the order specified and some steps may be omitted or changed in order. The method 500 may be a recursive method that continuously repeats. For example, sensor data may continuously be collected and customized driving assistance outputs may continually be determined based on the sensor data. The method 500 may be repeated in full or in part.

Figure 6:
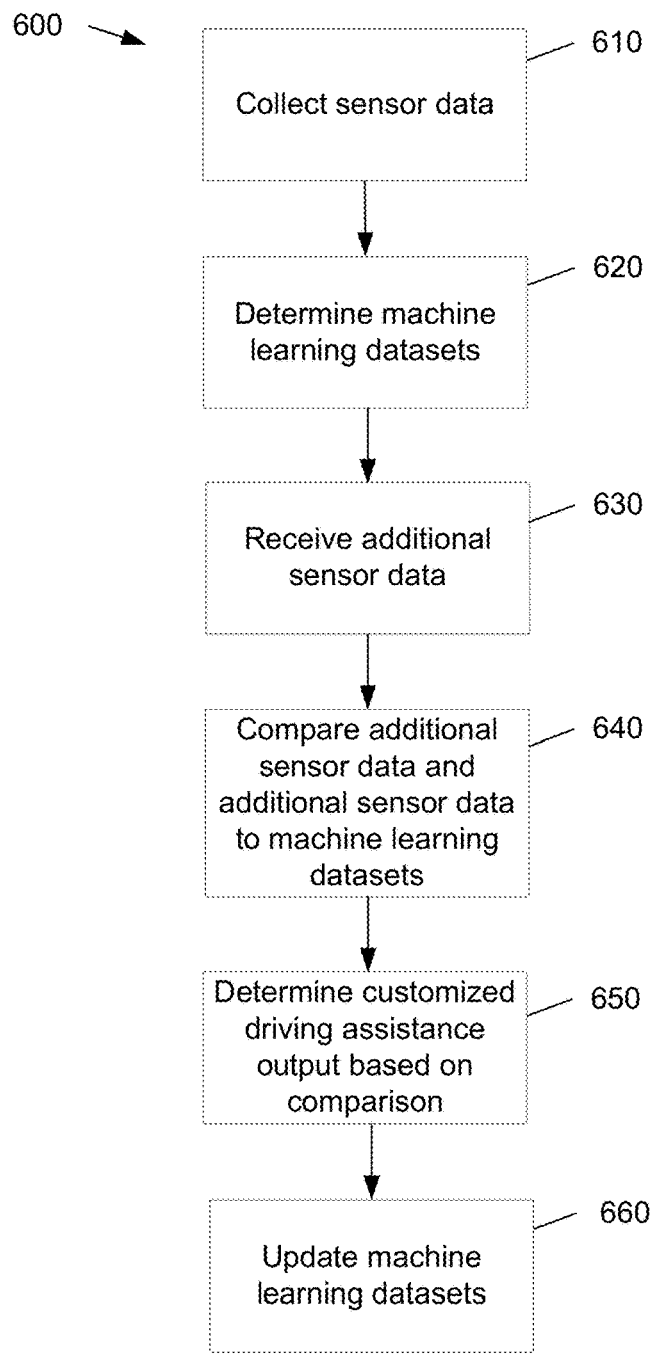
FIG. 6 a flow diagram illustrating a method for determining a customized driving assistance output based on machine learning datasets in accordance with one or more aspects described herein.

FIG. 6 shows a flow diagram for a method 600 for determining a customized driving assistance output based on machine learning datasets in accordance with one or more aspects described herein. For example, the method 600 may be used to determine the customized driving assistance output described above with regard to step 535. The method 600 or one or more steps thereof may be performed by one or more computing devices or entities. For example, portions of the method 600 may be performed by components of the system 100, the WAN networking environment 200, or the sensor data analysis and device control system 230. The method 600 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 600 may be performed by a server, such as the server 220 which may, in some examples, include a machine learning engine configured to generate one or more machine learning datasets. The server 220 may implement the method 600 in lieu of or in addition to the method described above with regard to step 535. Although the method 600 is described as being performed by the server 220, components of the system 100, WAN networking environment 200, or the sensor data analysis and device control system 230 may also perform one or more aspects of the process described.

At step 610, the server 220 may collect sensor data from a plurality of mobile devices associated with different drivers. The sensor data received at step 610 may comprise the known sensor data, the initial sensor data, and the additional sensor data described above with regard to steps 505, 520, and 530 respectively. For example, the sensor data may be received from a plurality of sensors associated with a plurality of devices or vehicles associated with a plurality of drivers. The sensor data may be associated with a plurality of driving hazards associated with a plurality of locations and driving situations. For example, the sensor data may comprise position sensor data, distance sensor data, speed sensor data, acceleration sensor data, orientation sensor data, speech sensor data, weather sensor data, moisture sensor data, humidity sensor data, temperature sensor data, light sensor data, camera data and the like. The sensor data may also indicate characteristics of the plurality of drivers such as age, driving experience, vision quality, aggregate driving outputs, and the like.

At step 620, the server 220 (e.g., a machine learning engine of server 220) may determine or generate, based on the sensor data, one or more machine learning datasets. The machine learning engine may generate machine learning datasets that may link a plurality of driving circumstances to customized driving assistance outputs. For example, based on received data, one machine learning dataset may relate a driver who is not paying attention with a high customized driving assistance output, and a small pothole with a low customized driving assistance output. The machine learning datasets may group together driving data under similar circumstances, for example driving data may be grouped into machine learning datasets based on numerous factors such as the hazard, an aggregate driving output associated with the driver, aggregate driving outputs associated with drivers of other nearby vehicles, a time, weather conditions, vehicle operating conditions, vehicle age, a driver's vision, a driver's age, a driver's experience, insurance information, distance traveled since the vehicle was turned on, distance since a last stop, speed, geographic location, and the like.

At step 630, the server 220 may receive, from one or more sensors at a mobile device, additional sensor data. The additional sensor data may be associated with a particular driver. The additional sensor data may be similar to the sensor data described above at step 610. This sensor data may comprise the known data described above at step 505, the initial sensor data collected by the mobile device at step 520, and the additional sensor data collected by the mobile device at step 530.

At step 640, the server 220 may compare the sensor data to the machine learning datasets. For example, the server 220 may implement machine learning algorithms to determine whether the sensor data matches one or more machine learning datasets to a degree that exceeds a predetermined correlation threshold. For example, the server 220 may implement at least one of: decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning, regression, and the like.

The server 220 may use the one or more machine learning datasets to inform the determination of an appropriate customized driving assistance output. The server 220 may compare a first portion of the sensor data to a first machine learning dataset and may compare a second portion of the sensor data to a second machine learning dataset. The server 220 may compare the entirety of the sensor data to a single machine learning dataset or multiple common machine learning datasets.

At step 650, the server 220 may determine, based on the comparison described above with regard to step 630, a customized driving assistance output. For example, the server 220 may quantify the determination of how the additional sensor data compares to the machine learning datasets. For example, if a correlation between the additional sensor data and one of the machine learning datasets exceeds the predetermined correlation threshold, then the additional sensor data may be correlated to a customized driving assistance output associated with the one of the machine learning datasets. The customized driving assistance output may comprise the customized driving assistance output described above with regard to step 535. Based on the customized driving assistance output, the server 220 may determine and transmit, to a user device, a notification output and an instruction output. For example, these may be the notification output and the instruction output described at steps 545 and 550 respectively.

At step 660, the server 220 may update or validate, based on the sensor data, the machine learning datasets.

Although steps 610-660 are shown in one example order in FIG. 6, steps 610-660 need not all be performed in the order specified and some steps may be omitted or changed in order. The method 600 may be a recursive method that continuously repeats. For example, sensor data may continuously be collected and customized driving assistance outputs may continually be determined based on the sensor data. The method 600 may be repeated in full or in part.

Figure 7:
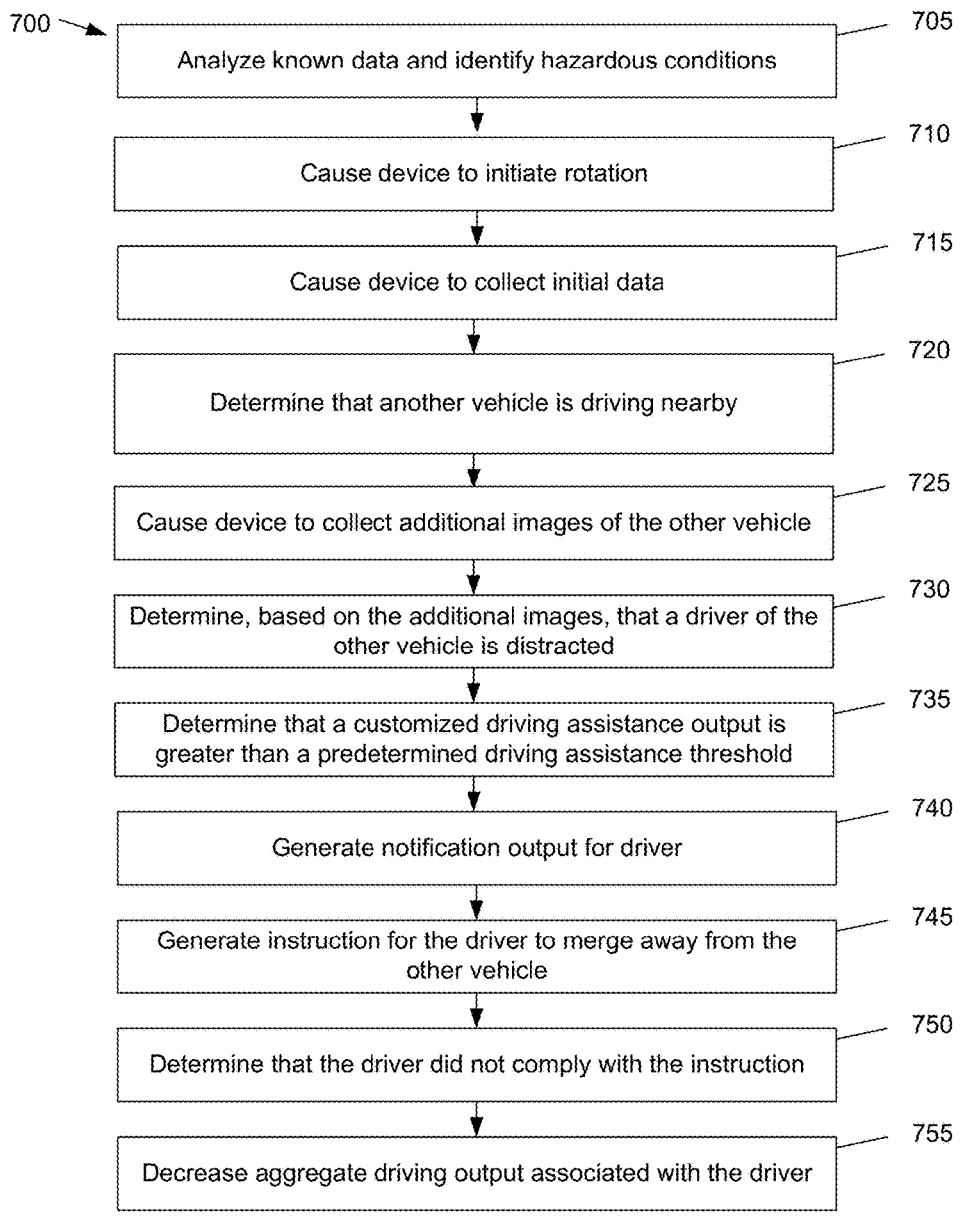
FIG. 7 shows illustrates a flow diagram for a method for determining a customized driving assistance output, based on machine learning datasets, associated with a nearby vehicle in accordance with one or more aspects described herein.

FIG. 7 illustrates a flow diagram for a method 700 for determining a customized driving assistance output, based on machine learning datasets, associated with a nearby vehicle in accordance with one or more aspects described herein. The method 700 or one or more steps thereof may be performed by one or more computing devices or entities. For example, portions of the method 700 may be performed by components of the system 100, the WAN networking environment 200, or the sensor data analysis and device control system 230. The method 700 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 700 may be performed by a server, such as the server 220 which may, in some examples, include a machine learning engine configured to generate one or more machine learning datasets. The method 700 illustrates one example implementation of the method 500.

At step 705, the system 230, which may be integrated into a mobile device, may analyze known data and identify hazardous conditions. For example, the system 230 may analyze sensor data and compare it to one or more known thresholds, limits, or the like to identify a hazardous condition. The analysis may, in some examples, be performed in real-time or near real-time. Accordingly, if inclement weather is occurring, icy or slick road conditions exist, visibility is low, or the like, the system 230 may analyze the data and identify the potentially hazardous condition. Actions performed at step 705 may be similar to those described above with regard to step 505.

At step 710, based on the determination at step 705 that the hazardous condition exists, the system 230 may transmit a signal, instruction or command to a mobile device causing rotation of the mobile device. Actions performed at step 710 may be similar to those described above with regard to step 515.

At step 715, initial sensor data may be collected by one or more sensors in, for example, the mobile device. For example, the initial sensor data may comprise at least one of: video sensor data, audio sensor data, vibration sensor data, and proximity sensor data associated with a vehicle and its surroundings. Actions performed at step 715 may be similar to those described above with regard to step 520.

At step 720, the system 230 may determine, based on the initial sensor data and/or vehicle sensor data, that another vehicle is driving nearby. For example, the system 230 may determine, based on images captured during the rotation, proximity sensors arranged in the mobile device or vehicle, or the like, that the other vehicle is driving within a predefined threshold distance of the mobile device, a vehicle in which the mobile device is located, or the like. The system 230 may perform object recognition on the images, and may determine that the images include the other vehicle. The system 230 may then transmit a signal, command or instruction to the mobile device causing the mobile device to maintain a position oriented toward the other vehicle. For example, based on the visibility level, the system 230 may determine that the other vehicle may comprise a potential hazard. Actions performed at step 720 may be similar to those described above with regard to steps 510 and 525.

At step 725, after recognizing the other vehicle, the system 230 may transmit a signal, command or instructions to the mobile device causing the mobile device to collect additional images of the other vehicle. Actions performed at step 725 may be similar to those described above with regard to step 530.

At step 730, the system 230 may perform object recognition on the additional images of the other vehicle. For example, the system 230 may determine that a driver of the other vehicle is distracted (e.g., holding a cup of coffee and does not have his or her hands on the steering wheel, using a hand held mobile device, or the like). Using machine learning algorithms, the system 230 may analyze the current driving circumstances, including the initial sensor data, the weather conditions, and the additional images, to determine a customized driving assistance output. Actions performed at step 730 may be similar to those described above with regard to steps 530 and 535.

At step 735, the system 230 may determine that the customized driving assistance output exceeds the predetermined driving assistance threshold. For example, based on the conditions, the system 230 may determine that the driver should be notified of the other vehicle. Actions performed at step 735 may be similar to those described above with regard to step 540.

At step 740, the system 230 may generate a warning and may cause the mobile device to display the warning to the driver. For example, the warning may comprise the notification output described above with regard to step 545.

At step 745, the system 230 may cause the mobile device to instruct the driver to modify a position of the vehicle (e.g., change lanes, merge away from the other vehicle, or the like). For example, the system 230 may generate the instruction output described above with regard to step 550.

At step 750, the system 230 may determine that the driver did not comply with the instruction. For example the driver may have provided a verbal indication to the mobile device that he or she would not switch lanes. Additionally or alternatively, sensor data collected from vehicle sensors, mobile device sensors, or the like, may indicate that a position of the vehicle has not changed. Actions performed at step 750 may be similar to those described above with regard to step 555.

At step 755, the system 230 may decrease an aggregate driving output associated with the driver. Actions performed at step 755 may be similar to those described above with regard to step 560.

Although steps 705-755 are shown in one example order in FIG. 7, steps 705-755 need not all be performed in the order specified and some steps may be omitted or changed in order. The method 700 may be a recursive method that continuously repeats. For example, sensor data may continuously be collected and customized driving assistance outputs may continually be determined based on the sensor data. The method 700 may be repeated in full or in part.

Figure 8:
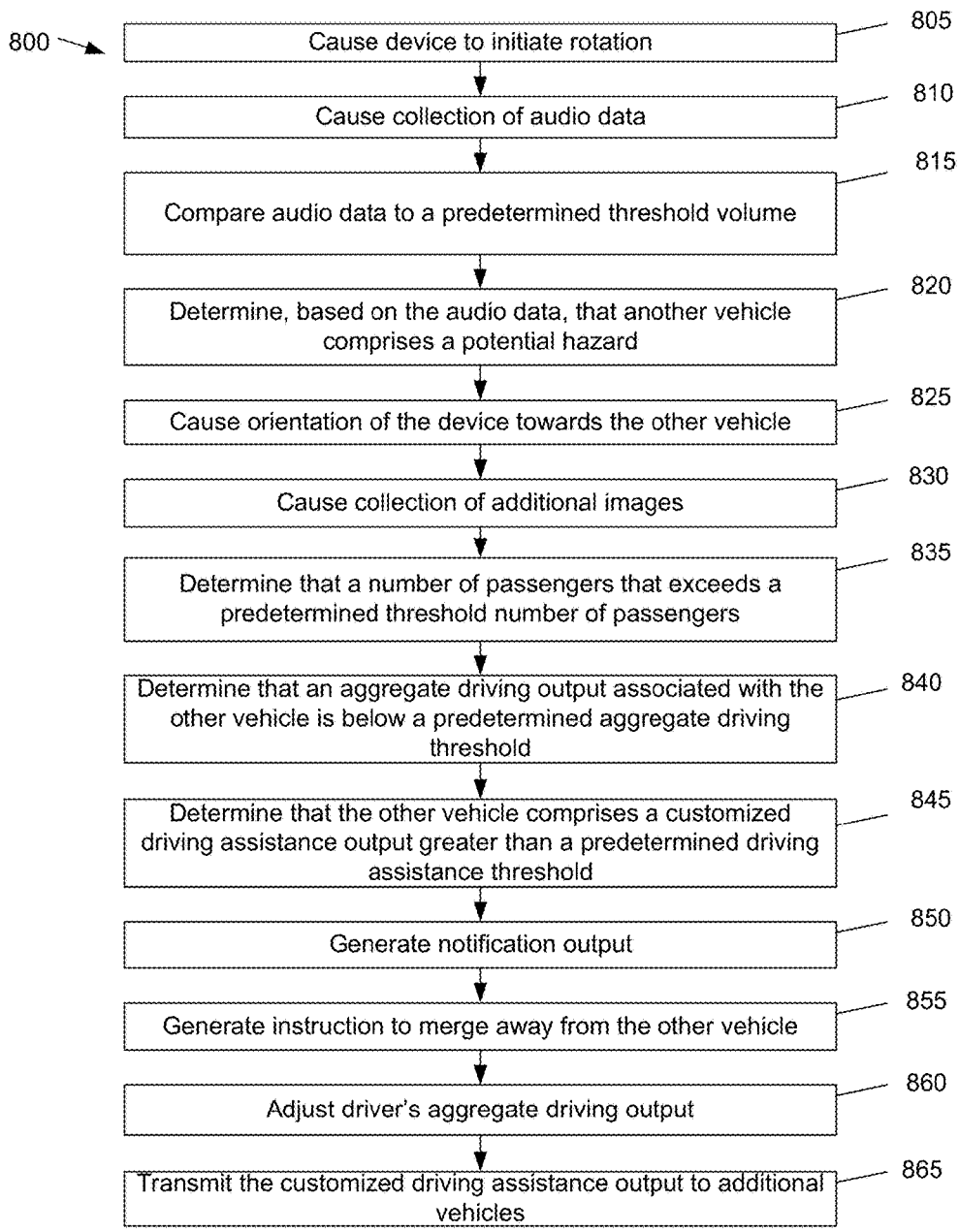
FIG. 8 illustrates a flow diagram for a method for causing orientation of a mobile device towards a nearby vehicle based on audio sensor data and determining a customized driving assistance output based on machine learning datasets in accordance with one or more aspects described herein.

FIG. 8 illustrates a flow diagram for a method 800 for causing orientation of a mobile device towards a nearby vehicle based on audio sensor data and determining a customized driving assistance output based on machine learning datasets in accordance with one or more aspects described herein. The method 800 or one or more steps thereof may be performed by one or more computing devices or entities. For example, portions of the method 800 may be performed by components of the system 100, the WAN networking environment 200, or the sensor data analysis and device control system 230. The method 800 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 800 may be performed by a server, such as the server 220 which may, in some examples, include a machine learning engine configured to generate one or more machine learning datasets. The method 800 illustrates one example implementation of the method 500.

At step 805, the system 230, which may be integrated into a mobile device, may cause (e.g., transmit an instruction, command, signal or the like controlling the mobile device) the mobile device to initiate device rotation. Actions performed at step 805 may be similar to those described above with regard to step 515.

At step 810, the system 230 may cause (e.g., transmit an instruction, command, signal or the like controlling the mobile device) the mobile device to collect initial sensor data. For example, the initial sensor data may comprise video sensor data, audio sensor data, vibration sensor data, and proximity sensor data. Actions performed at step 810 may be similar to those described above with regard to step 520.

At step 815, the system 230 may determine a potential hazard. For example, via analysis of audio sensor data collected by microphones and audio sensors arranged in the mobile device or vehicle, or the like during the rotation, the system 230 may determine that another vehicle has noises emanating from it that exceed a predetermined volume threshold of the mobile device, a vehicle in which the mobile device is located, or the like. For example, the system 230 may determine that the other vehicle is playing loud music, and that the passengers are loudly singing along.

At step 820, based on the analysis performed at step 815, the system 230 may determine that the other vehicle comprises a potential hazard. Actions described at steps 815 and 820 may be similar to those described above with regard to step 525.

At step 825, based on the determination made a step 820, the system 230 may transmit a signal, a command, or an instruction to the mobile device, causing the mobile device to maintain a position oriented towards the other vehicle for the purpose of collecting additional sensor data. Actions performed at step 825 may be similar to those described above at step 510.

At step 830, based on the determination at step 820 that the other vehicle comprises a potential hazard, the system 230 may transmit a signal, a command, or an instruction to the mobile device to collect additional images of the other vehicle. The additional images may comprise the additional sensor data described above at step 530.

At step 835, the system 230 may determine, based on the additional images captured at step 830, that the other vehicle contains a number of passengers that exceeds a predetermined threshold number of passengers of the mobile device, a vehicle in which the mobile device is located, or the like. For example, the system 230 may cause the mobile device to perform object recognition on the additional images to determine the number of passengers.

At step 840, the system 230 may analyze a license plate tag associated with the other vehicle. The license plate tag may be associated with an aggregate driving output that comprises a rating or level of safety of a driver on the road based on an aggregation of data comprising a driving history. Using machine learning algorithms and machine learning datasets, the system 230 may analyze the aggregate driving output, and may determine that the aggregate driving output is below a predetermined aggregate driving output threshold.

At step 845, the system 230 may use machine learning algorithms and machine learning datasets to determine a customized driving assistance output. For example, the system 230 may compare the initial sensor data and the additional sensor data to machine learning datasets comprising similar sensor data. This may allow the system 230 to identify previously determined customized driving assistance outputs associated with similar driving circumstances. For example, the system 230 may analyze machine learning datasets comprising driving circumstances in which another vehicle is approaching. The system 230 may further refine the machine learning datasets to comprise driving circumstances (e.g., a number of passengers in the other vehicle exceeds the predetermined threshold, a noise level emanating from the other vehicle exceeds the predetermined volume threshold, an aggregate driving output of the driver is below the predetermined threshold, and the like). By analyzing the sensor data in this way, the system 230 may more accurately determine a customized driving assistance output for a plurality of drivers in a plurality of driving circumstances. In this example, the system 230 may determine that the customized driving assistance output exceeds a predetermined driving assistance threshold. Actions performed at step 845 may be similar to those described at steps 535 and 540.

At step 850, based on the determination at step 845 that the customized driving assistance output exceeds the predetermined driving assistance threshold, the system 230 may generate a warning and may transmit a signal, a command, or an instruction to the mobile device, causing the mobile device to display the warning. The warning may comprise the notification output described above with regard to step 545.

At step 855, the system 230 may generate an instruction and may transmit a signal, a command, or an instruction to the mobile device, causing the mobile device to instruct the driver to merge away from the other vehicle. This instruction may comprise the instruction output described above with regard to step 550.

At step 860, the system 230 may determine whether the driver complied with the instruction output. If the driver merged into another lane, and thus complied with the instruction output, the system 230 may increase an aggregate driving output associated with the driver. If the driver remained in the same lane, and thus did not comply with the instruction, the system 230 may decrease the aggregate driving output associated with the driver. For example the driver may have provided a verbal indication to the mobile device that he or she would not switch lanes. Additionally or alternatively, sensor data collected from vehicle sensors, mobile device sensors, or the like, may indicate that a position of the vehicle has not changed. Actions performed at step 860 may be similar to those described above with regard to steps 555-565.

At step 865, the system 230 may transmit a signal, a command, or an instruction to the mobile device, causing the mobile device to transmit the customized driving assistance output to additional vehicles. For example, the system 230 may cause the mobile device to transmit an indication of a potential risk to the additional vehicles. In this example, the system 230 may cause the mobile device to transmit the customized driving assistance output to other mobile devices, located within the additional vehicles. In another example, the system 230 may store the customized driving assistance output at a shared server that may be accessed by the other mobile devices. Actions performed at step 865 may be similar to those described at step 570.

Although steps 805-865 are shown in one example order in FIG. 8, steps 805-865 need not all be performed in the order specified and some steps may be omitted or changed in order. The method 800 may be a recursive method that continuously repeats. For example, sensor data may continuously be collected and customized driving assistance outputs may continually be determined based on the sensor data. The method 800 may be repeated in full or in part.

Figure 9:
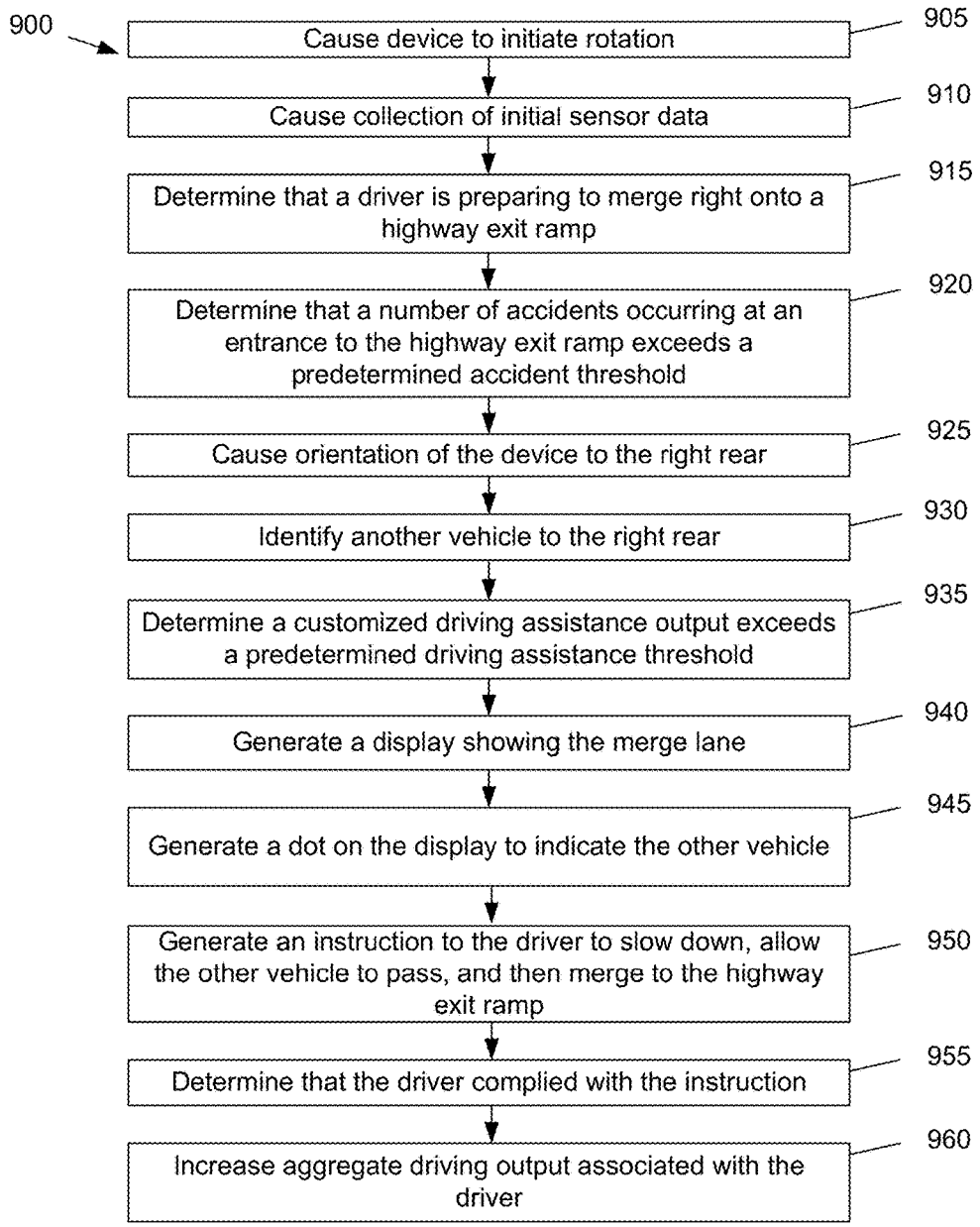
FIG. 9 shows a flow diagram for a method for causing orientation of a mobile device based on known data and determining a customized driving assistance output, based on machine learning datasets, associated with a nearby vehicle in accordance with one or more aspects described herein.

FIG. 9 shows a flow diagram for a method 900 for causing orientation of a mobile device based on known data and determining a customized driving assistance output, based on machine learning datasets, associated with a nearby vehicle in accordance with one or more aspects described herein. The method 900 or one or more steps thereof may be performed by one or more computing devices or entities. For example, portions of the method 900 may be performed by components of the system 100, the WAN networking environment 200, or the sensor data analysis and device control system 230. The method 900 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 900 may be performed by a server, such as the server 220 which may, in some examples, include a machine learning engine configured to generate one or more machine learning datasets. The method 900 illustrates one example implementation of the method 500.

At step 905, the system 230, such as the sensor data analysis and device control system 230, may transmit a signal, instruction, or command to a mobile device causing rotation of the mobile device. Actions performed at step 905 may be similar to those described above at step 515.

At step 910, initial sensor data, such as video sensor data, audio sensor data, vibration sensor data, and proximity sensor data may be collected by one or more sensors in, for example, the mobile device. Actions performed at step 910 may be similar to those described above with regard to step 520.

At step 915, the system 230 may analyze other data, such as a known route of the vehicle, a risk map for the known route, and insurance information. The analysis may, in some examples, be performed in real-time or near real-time. Accordingly, if a route of the vehicle is known, the system 230 may analyze the other data to determine potential upcoming maneuvers (e.g., based on the known route, the system 230 may determine that a driver is preparing to merge right onto a highway exit ramp).

At step 920, the mobile device may continue to analyze the other data. For example, the system 230 may analyze the other data and compare it to one or more known thresholds, limits, or the like to identify a hazardous location. The analysis may, in some examples, be performed in real-time or near real-time. Accordingly, if the risk map, the known route, or the insurance information are known, the system 230 may analyze the data to determine the hazardous location. As an example, the system 230 may determine that a number of accidents occurring at an entrance to the highway exit ramp exceeds a predetermined accident threshold of the mobile device or the vehicle. For example, the system 230 may access a historical accident database from, for example, an insurance server. The historical accident database may maintain a quantity of accidents per location.

At step 925, based on the determinations made at steps 915 and 920, the system 230 may transmit a signal, command or instruction causing the mobile device to orient itself to the right rear of the vehicle. For example, the system 230 may determine that based on the initial sensor data and the other data, the vehicle is most likely to face a hazard from the right rear of the vehicle. By orienting itself in this direction, cameras and sensors comprising the mobile device may be more efficient at spotting and detecting, for example, another vehicle who is within a predetermined threshold distance of the mobile device, the vehicle, and the like behind the vehicle or who is also merging onto the highway exit ramp. For example, by turning to the right rear of the vehicle, rather than merely reaching the right rear as part of a full rotation, the sensors arranged in the mobile device may more quickly capture data and determine whether a potential hazard exists. After causing the mobile device to orient its position to the right rear of the vehicle, the system 230 may transmit a signal, command, or instruction to the mobile device causing the mobile device to continue to collect initial sensor data. Actions performed at steps 915-925 may be similar to those described above at step 510.

At step 930, the system 230 may actually identify another vehicle within the predetermined threshold, and to the right rear, of the mobile device or the vehicle. For example, the mobile device may use object recognition to analyze images collected at step 925.

At step 935, the system 230 may determine whether a customized driving assistance output associated with the other vehicle exceeds a predetermined driving assistance threshold. For example, the system 230 may determine, using machine learning algorithms and machine learning datasets, the customized driving assistance output. For example, the customized driving assistance output may be determined via the method 600. The system 230 may then compare the customized driving assistance output to a predetermined driving assistance threshold to determine whether it is worth warning the driver. The customized driving assistance output may be based, for example, on the speed of the vehicles, a visibility level, an aggregate driving output associated with the driver of the vehicle, an aggregate driving output associated with the driver of the other vehicle, historical accident data, insurance information, and the like. In this example, the system 230 may determine that the customized driving assistance output exceeds the predetermined driving assistance threshold. Actions performed at step 935 may be similar to those described above at steps 535 and 540.

At step 940, based on the determination at step 935 that the customized driving assistance output exceeds the predetermined driving assistance threshold, the system 230 may generate a notification output to warn the driver of the other vehicle, and may transmit a signal, command, or instruction to the mobile device to communicate the notification output to the driver. For example, as described further below with regard to FIG. 10, the system 230 may generate a display that shows the lane of the vehicle, as well as the highway exit ramp, and may cause the mobile device to output the display.

At step 945, the system 230 may cause the mobile device to generate a red dot on the display of the mobile device to show a position of the other vehicle. This may comprise the notification output described above at step 545.

At step 950, after causing the mobile device to warn the driver of the other vehicle via the red dot on the display, the system 230 may generate an instruction output for the driver. For example, the system 230 may generate an instruction to the driver to slow down, allow the other vehicle to pass, and then to merge on to the highway exit ramp. This instruction output may comprise an audio output or a visual output. After generating the instruction output, the system 230 may cause the mobile device to communicate the instruction output to the driver. For example, the system 230 may cause the mobile device to project the audio output for the driver to hear. In some examples, the system 230 may cause the mobile device to establish a Bluetooth connection with the vehicle, and thus may project the audio output via speakers integrated into the vehicle. Actions performed at step 950 may be similar to those described above at step 550.

At step 955, after generating the instruction output at step 950, the system 230 may determine that the driver complied with the instruction. For example, the mobile device may use global positioning systems (GPS), motion sensors, cameras and the like to determine that the vehicle continued to drive straight while the other vehicle passed, and then, after the other vehicle passed, the vehicle merged onto the highway exit ramp. In another example, the driver may provide an indication of compliance to the system 230. For example, the driver may speak "Will do" into the microphone of the mobile device. The system 230 may perform voice recognition on the audio input, and may determine that the driver complied with the instruction output. Actions performed at step 955 may be similar to those described above at step 555.

At step 960, after determining that the driver complied with the instruction at step 960, the system 230 may increase the aggregate driving output associated with the driver. For example, the aggregate driving output may comprise a numeric value that indicates a risk factor for the driver. An insurance company may use the personalized driving output to adjust insurance rates and to offer insurance incentives. For example, based on the increase in the personalized driving output, the driver may receive a reduction in an insurance premium. Actions performed at step 960 may be similar to those described above at step 570.

Although steps 905-960 are shown in one example order in FIG. 9, steps 905-960 need not all be performed in the order specified and some steps may be omitted or changed in order. The method 900 may be a recursive method that continuously repeats. For example, sensor data may continuously be collected and customized driving assistance outputs may continually be determined based on the sensor data. The method 900 may be repeated in full or in part.

Figure 10:
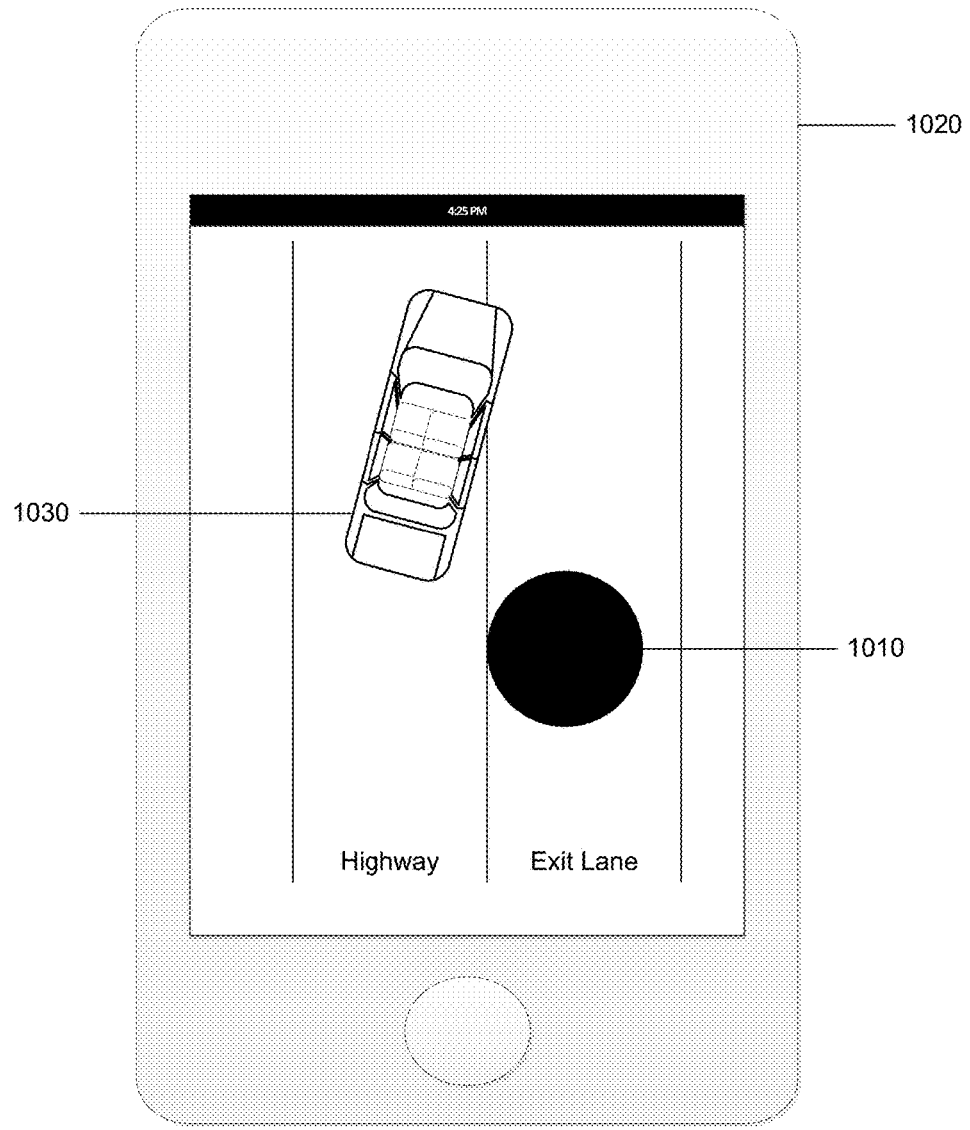
FIG. 10 shows an example notification output on a mobile device display in accordance with one or more aspects described herein.

FIG. 10 shows an example notification output on a mobile device display in accordance with one or more aspects described herein. As described above with regard to step 940, a system, such as the sensor data analysis and device control system 230, may generate a notification output to warn a driver of a potential hazard 1010 and may cause the notification to display on a mobile device, such as mobile device 1020. For example, as described above with regard to the method 900, the mobile device 1020 may display a notification that includes a vehicle 1030 driving in a lane of a highway. The notification may also include an image 1010 to represent the potential hazard. For example, the potential hazard 1010 may comprise another vehicle driving to the right rear of the vehicle 1030 in an exit lane of the highway. For example, the image of the potential hazard 1010 may comprise a large dot or other shape that stands out against the rest of the display. In some examples, the dot or other shape may be brightly colored, may be red, or may include other colors, features, animation, or the like, to draw the attention of the use to the potential hazard 1010. This may allow the driver to quickly and easily observe a location of the potential hazard. Alternatively, the image of the potential hazard 1010 may comprise an indication of the type of hazard. For example, the image of the potential hazard 1010 may comprise a picture of a vehicle, similar to the vehicle 1030. The display may update in real time or near real-time. For example, the display may show progress of both the vehicle 1030 and the image of the potential hazard 1010 as the vehicle 1030 and the other vehicle, represented by the image of the potential hazard 1010, continue to drive. The notification may also include an audio output to accompany the display. For example, the notification may include an audio output comprising "Vehicle to the right rear."

Figure 11:
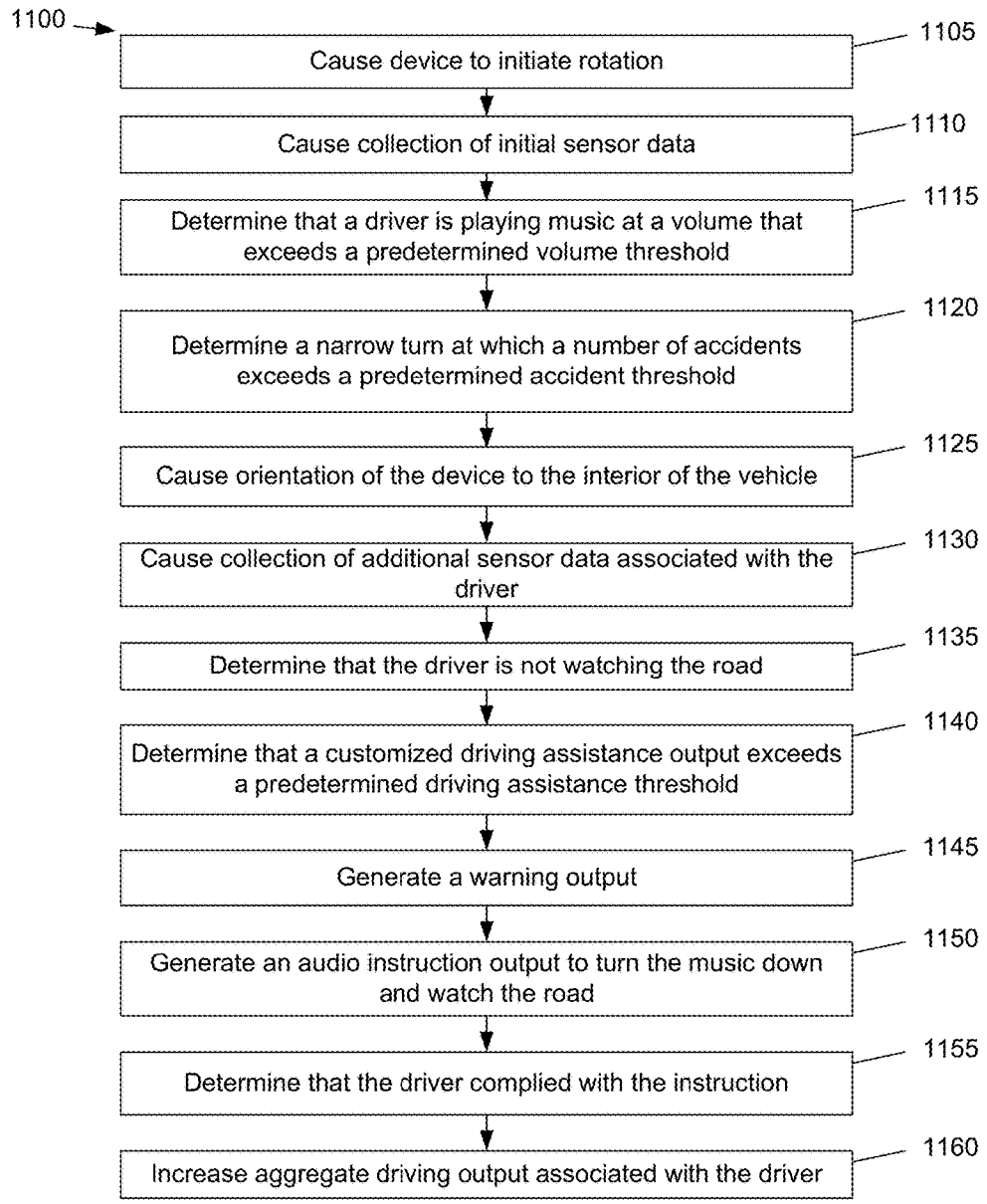
FIG. 11 illustrates a flow diagram for a method for determining a customized driving assistance output, based on machine learning datasets, associated with a driver in accordance with one or more aspects described herein.

FIG. 11 illustrates a flow diagram for a method 1100 for determining a customized driving assistance output, based on machine learning datasets, associated with a driver in accordance with one or more aspects described herein. The method 1100 or one or more steps thereof may be performed by one or more computing devices or entities. For example, portions of the method 1100 may be performed by components of the system 100, the WAN networking environment 200, or the sensor data analysis and device control system 230. The method 1100 or one or more steps thereof may be embodied in computer-executable instructions that are stored in a computer-readable medium, such as a non-transitory computer readable medium. The steps in this flow diagram need not all be performed in the order specified and some steps may be omitted or changed in order. The method 1100 may be performed by a server, such as the server 220 which may, in some examples, include a machine learning engine configured to generate one or more machine learning datasets. The method 1100 illustrates one example implementation of the method 500.

At step 1105, the system 230 may cause (e.g., transmit an instruction, command, signal or the like controlling the mobile device) a mobile device to initiate rotation. Actions performed at step 1105 may be similar to those described above at step 515.

At step 1110, initial sensor data may be collected by one or more sensors in, for example, the mobile device. For example, the system 230 may cause the one or more sensors to collect video sensor data, audio sensor data, vibration sensor data, proximity sensor data and the like. Actions performed at step 1110 may be similar to those described above at step 520.

At step 1115, the system 230 may determine, using the initial sensor data collected at step 1110, that a driver of a vehicle may is playing music at a volume greater than a predetermined volume threshold of the mobile device, the vehicle, or the like. For example, the system 230 may analyze audio data comprising the initial sensor data to determine the volume. The system 230 may analyze the volume via machine learning algorithms to determine that it exceeds the predetermined volume threshold.

At step 1120, the system 230 may analyze known sensor data such as a known route of the vehicle, a risk map for the known route, weather information, and insurance information. For example, the system 230 may collect this data from applications on the mobile device and stored databases. Based on the known sensor data, the system 230 may determine that the driver is heading towards a narrow turn at which a number of accidents within the last month exceeds a predetermined threshold of the mobile device, the vehicle, or the like. Using machine learning algorithms, the system 230 may determine that additional sensor data should be collected. For example, the system 230 may determine that the loud music is likely distracting the driver, thus increasing a risk associated with the narrow turn.

At step 1125, based on the determination at step 1120 that additional sensor data should be collected, the system 230 may cause (e.g., transmit an instruction, command, signal or the like controlling the mobile device) the mobile device to maintain a position oriented towards the interior of the vehicle to collect additional sensor data associated with the driver. Actions performed at step 1125 may be similar to those described above at step 510.

At step 1130, the system 230 may cause (e.g., transmit an instruction, command, signal or the like controlling the mobile device) the sensors arranged in the mobile device, the vehicle, or the like to collect the additional sensor data associated with the driver. For example, a camera comprising the mobile device may collect additional imaging. Actions performed at step 1140 may be similar to those described above with regard to step 530.

At step 1135, the system 230 may analyze the additional sensor data. For example, the system 230 may perform object recognition on the additional imaging. Based on the analysis, the system 230 may determine that the driver is distracted (e.g., eyes are not on the road, reaching for something in the back seat, is looking out a side window, or the like).

At step 1140, the system 230 may analyze the additional sensor data via machine learning algorithms and machine learning datasets to determine whether a customized driving assistance output associated with the known sensor data, the initial sensor data, and the additional sensor data exceeds a predetermined driving assistance threshold associated with the mobile device, the vehicle, or the like. The system 230 may implement machine learning algorithms, for example, as described above with regard to the method 600. For example, system 230 may compare the initial sensor data, other data, and additional sensor data to a plurality of machine learning datasets. Each of the plurality of machine learning datasets may comprise various driving data and an associated customized driving assistance output. By comparing driving circumstances of the current driving trip (e.g., the upcoming turn, the amount of accidents exceeded the predetermined threshold, the loud music, and the fact that the driver is not watching the road, or the like) to historical driving data in the machine learning datasets, the system 230 may determine a customized driving assistance output for the current driving trip. Actions performed at step 1140 may be similar to those described above with regard to step 540.

At step 1145, based on the determination at step 1140 that the customized driving assistance output exceeds the predetermined driving assistance threshold, the system 230 may generate a notification output. For example, the notification output may warn the driver of the impending risk. The system 230 may cause (e.g., transmit an instruction, command, signal or the like controlling the mobile device) the mobile device to communicate the notification output to the driver. An example of a notification output is described further below with regard to FIG. 12.

Figure 12:
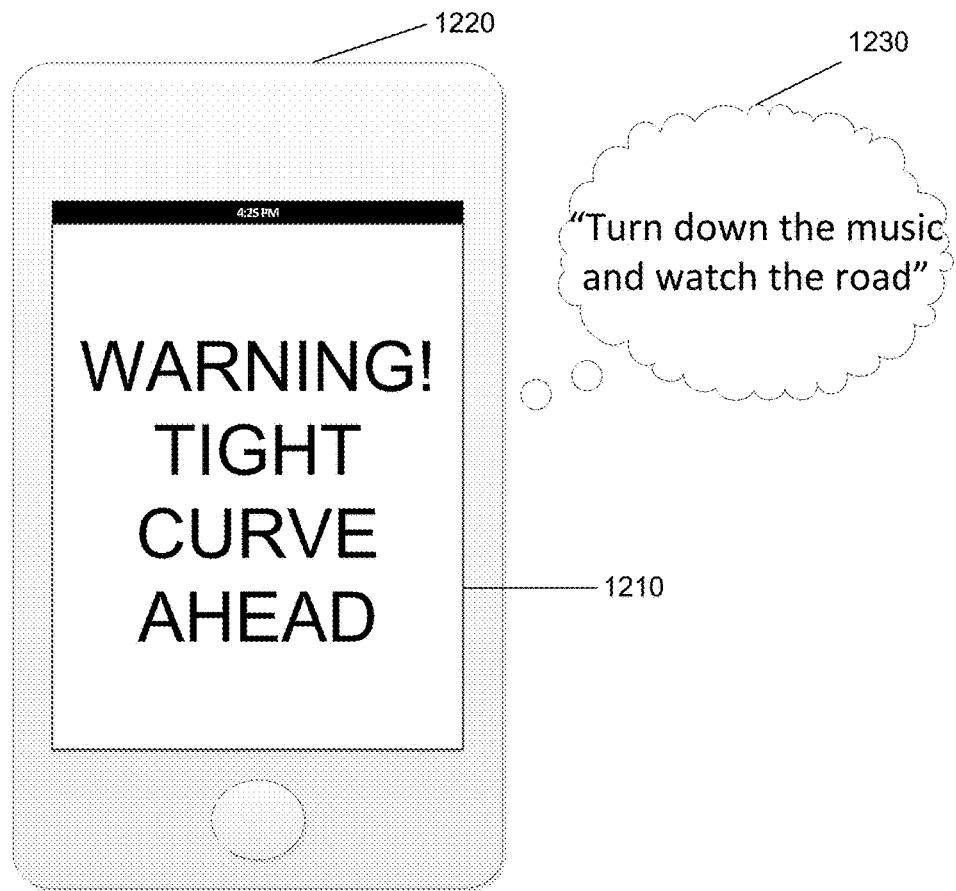
FIG. 12 shows an example notification output on a mobile device display and an example instruction output in accordance with one or more aspects described herein.

At step 1150 the system 230 may generate an instruction output. The system 230 may cause (e.g., transmit an instruction, command, signal or the like controlling the mobile device) the mobile device to output the instruction output. For example, the mobile device may generate an audio instruction comprising "Turn the music down and watch the road." This example is shown in FIG. 12.

At step 1155, the system 230 may determine that the driver complied with the instruction output. Sensor data collected from vehicle sensors, mobile device sensors, or the like, may indicate that the volume of the music has decreased to below the predetermined volume threshold and that the driver is not distracted. Actions described at step 1155 may be similar to those described at step 555.

At step 1160, based on a determination that the driver complied with the instruction output, the system 230 may increase an aggregate driving output associated with the driver. Actions described at step 1160 may be similar to those described above at step 565.

Although steps 1105-1160 are shown in one example order in FIG. 11, steps 1105-1160 need not all be performed in the order specified and some steps may be omitted or changed in order. The method 1100 may be a recursive method that continuously repeats. For example, sensor data may continuously be collected and customized driving assistance outputs may continually be determined based on the sensor data. The method 1100 may be repeated in full or in part.

FIG. 12 shows an example notification output on a mobile device display and an example instruction output in accordance with one or more aspects described herein. For example, a system, such as the sensor data analysis and device control system 230, may cause (e.g., transmit an instruction, command, signal or the like controlling the mobile device) a mobile device 1220 to display a notification output 1210 and may cause the mobile device 1220 to output an instruction output 1230. For example, the system 230 may cause the mobile device to display a text based warning, such as "Warning! Tight curve ahead." The system 230 may also cause the mobile device to output an audio output such as "Turn down the music and watch the road." The notification output 1210 and the instruction output 1230 may correspond to the notification output and instruction output generated at steps 1145 and 1150 respectively.

Figure 13:
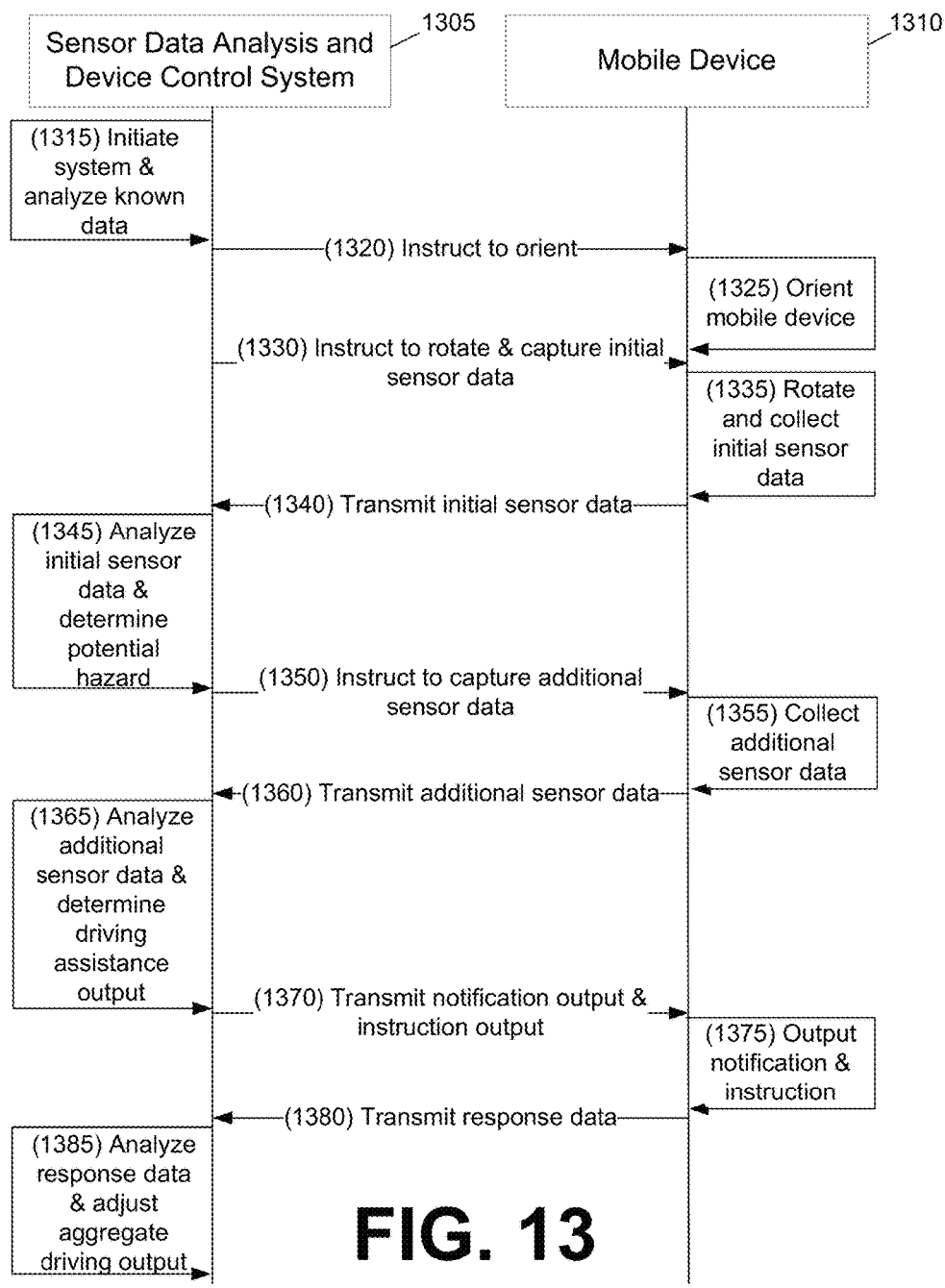
FIG. 13 depicts an illustrative event sequence between a sensor data analysis and device control system and a mobile device for determining a customized driving assistance output.

FIG. 13 depicts an illustrative event sequence between a sensor data analysis and device control system and a mobile device for determining a customized driving assistance output. While the steps shown FIG. 13 are presented sequentially, the steps need not follow the sequence presented and may occur in any order. Additionally or alternatively, one or more steps or processes (e.g., as discussed herein with respect to other figures) may be added or omitted without departing from the invention.

At step 1315, a sensor data analysis and device control system 1305 may initiate, and analyze known data. The sensor data analysis and device control system 1305 may comprise or be substantially similar to the sensor data analysis and device control system 230 described above. The sensor data analysis and device control system 1305 may initiate based on a determination that the ignition of a vehicle, in which a mobile device 1310 is located, has started. Once initiated, the sensor data analysis and device control system 1305 may analyze known data such as a known route of the vehicle, a risk map for the known route, weather information, insurance information, and the like. Actions performed by the sensor data analysis and device control system at step 1315 may be similar to those described above with regard to step 505.

At step 1320, the sensor data analysis and device control system 1305 may transmit, to the mobile device 1310, an instruction to orient based on the known data. For example, the sensor data analysis and device control system 1305 may determine whether a particular orientation of the mobile device 1310 would allow it to more effectively capture sensor data associated with a hazard, the sensor data analysis and device control system 1305 may cause (e.g., transmit an instruction, command, signal or the like controlling the mobile device 1310) the mobile device 1310 to adopt that orientation. Actions performed at step 1320 may be similar to those described above with regard to step 510.

At step 1325, the mobile device may orient itself based on the instruction transmitted at step 1320 from the sensor data analysis and device control system. Actions performed at step 1325 may be similar to those described above with regard to step 510.

At step 1330, the sensor data analysis and device control system 1305 may cause (e.g., transmit an instruction, command, signal or the like controlling the mobile device) mobile device 1310 to rotate and to capture initial data. For example, the sensor data analysis and device control system 1305 may determine that a vehicle has been turned on, and may instruct the mobile device 1310 to rotate and to capture initial data responsive to this determination. In some examples, the instruction, signal or command may include activating one or more image capturing devices on the mobile device (e.g., forward facing camera, rear facing camera, etc.) and/or may include controlling a mode in which images are captured (e.g., panoramic, black and white, etc.). Actions performed at step 1330 may be similar to those described with regard to steps 515 and 520.

At step 1335, the mobile device 1310 may rotate and capture initial data responsive to the instruction transmitted by the sensor data analysis and device control system 1305 at step 1330. The rotation may be horizontal rotation, vertical rotation, or a combination of horizontal and vertical rotations. The combination of horizontal and vertical rotations may comprise horizontal and vertical rotations occurring one after the other, or simultaneous horizontal and vertical rotations. During the rotations, the mobile device may capture initial data comprising at least one of: video sensor data, audio sensor data, vibration sensor data, and proximity sensor data. The initial data may comprise data from all sides of the vehicle, as well as the interior of the vehicle. Actions performed at step 1330 may be similar to those described with regard to steps 515 and 520.

At step 1340, the mobile device 1340 may transmit the initial data to the sensor data analysis and device control system 1305. For example, the mobile device 1340 may transmit the video sensor data, the audio sensor data, the vibration sensor data, and the proximity sensor data captured at step 1335.

At step 1345, the sensor data analysis and device control system 1305 may receive the initial data from the mobile device 1310, and may analyze the initial data to determine a potential hazard. The sensor data analysis and device control system may analyze the initial data along with the known data described in step 1315. If the sensor data analysis and device control system 1305 determines a potential hazard, it may cause (e.g., transmit an instruction, command, signal or the like controlling the mobile device 1310) the mobile device to capture additional sensor data. Actions performed at step 1345 may be similar to those described above with regard to step 525.

At step 1350, responsive to a determination at step 1345 that the initial data and known data indicate a potential hazard, the sensor data analysis and device control system 1305 may cause (e.g., transmit an instruction, command, signal or the like controlling the mobile device 1310) the mobile device 1310 to capture additional sensor data. Actions performed at step 1350 may be similar to those described above with regard to step 530.

At step 1355, responsive to receiving the instruction described above in step 1350, the mobile device 1310 may collect additional sensor data. The additional sensor data may comprise at least one of accelerometer data, speedometer data, compass data, gyroscope data, global positioning system (GPS) data, microphone data, seismometer data, environmental sensor data, thermometer data, light sensor data, and the like. Actions performed at step 1350 may be similar to those described above with regard to step 530.

At step 1360, the mobile device 1310 may transmit, to the sensor data analysis and device control system 1305 the additional sensor data.

At step 1365, the sensor data analysis and device control system 1305 may receive the additional data from the mobile device 1310, and may analyze the additional data to determine a customized driving assistance output associated with the potential hazard. For example, the customized driving assistance output may comprise a numeric value that quantifies a risk associated with the hazard. The sensor data analysis and device control system 1305 may determine the customized driving assistance output via machine learning algorithms and machine learning datasets. The sensor data analysis device and control system may then determine whether the customized driving assistance output exceeds a predetermined threshold. If the customized driving assistance output does exceed the predetermined threshold, the sensor data analysis and device control system 1305 may generate a notification output and an instruction output. The notification output may comprise an indication to a driver of the vehicle of the hazard. The instruction output may comprise an instruction, to the driver of the vehicle, to perform a particular action to avoid the hazard. Actions performed at step 1365 are similar to those described above with regard to steps 535-550.

At step 1370, the sensor data analysis and device control system 1305 may transmit the notification output and the instruction output to the mobile device 1310. The notification output and the instruction output may be transmitted via a single transmission or multiple transmissions. Actions performed at step 1370 may be similar to those described above with regard to steps 545 and 550.

At step 1375, after receiving the notification output and the instruction output, the mobile device 1310 may output them to the driver. For example, the mobile device 1310 may use a visual output to warn the driver of another vehicle approaching, and may use an audio output to instruct the driver to merge to avoid the other vehicle. The mobile device may also capture response data indicating how the driver reacted and responded to the instruction output. Actions performed at step 1375 may be similar to those described above with regard to steps 545 and 550.

At step 1380, the mobile device 1310 may transmit, to the sensor data analysis and device control system 1305, the response data.

At step 1385, the sensor data analysis and device control system 1305 may analyze the response data, and may determine whether the driver complied with the instruction output. The sensor data analysis and device control system 1305 may use this information to adjust an aggregate driving output associated with the driver. The aggregate driving output may comprise a numeric value that may be used to determine appropriate insurance rates and insurance incentives for a driver. If the driver did comply with the instruction output, sensor data analysis and device control system 1305 may increase the aggregate driving output. If the driver did not comply with the instruction output, the sensor data analysis and device control system may decrease the aggregate driving output. Actions performed at step 1385 may be similar to those described above with regard to steps 555-565.

Various aspects described herein may be embodied as a method, an apparatus, or as one or more computer-readable media storing computer-executable instructions.

Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing sensor or other data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A method comprising:
   transmitting, by a sensor data analysis and device control system including a processor and to a mobile device, an instruction to position an orientation of the mobile device within a first vehicle;
   receiving, by the sensor data analysis and device control system and from the mobile device, initial sensor data comprising sensor data around and within the first vehicle collected during or after the positioning;
   analyzing, in real-time and by the sensor data analysis and device control system, the initial sensor data to identify a potential hazard;
   receiving, after the identifying the potential hazard, by the sensor data analysis and device control system, and from the mobile device, additional sensor data associated with the potential hazard;
   determining, by the sensor data analysis and device control system and based on the initial sensor data and the additional sensor data, a customized driving assistance output associated with the potential hazard;
   generating, by the sensor data analysis and device control system and based on the customized driving assistance output, a notification output comprising an indication of the potential hazard; and
   generating, by the sensor data analysis and device control system and after the generating the notification output, an instruction output comprising an instruction to modify a position or operation of the first vehicle responsive to the potential hazard; and
   transmitting the notification output and the instruction output to the mobile device.

2. The method of claim 1, wherein the instruction to position the mobile device within the first vehicle comprises an instruction to initiate rotation of the mobile device within the first vehicle.

3. The method of claim 1, wherein the initial sensor data comprises at least one of: video sensor data, audio sensor data, vibration sensor data, and proximity sensor data.

4. The method of claim 1, further comprising:
   receiving, by the sensor data analysis and device control system, data related to at least one of: a known route of the first vehicle, a risk map for the known route, weather information, and insurance information;
   analyzing, by the sensor data analysis and device control system, the data to identify an orientation for the mobile device; and
   transmitting, by the sensor data analysis and device control system and to the mobile device, an instruction to modify a position of the mobile device to the identified orientation.

5. The method of claim 4, wherein the identifying the potential hazard comprises identifying, during the receiving the initial sensor data, the potential hazard.

6. The method of claim 1, wherein the potential hazard comprises at least one of: a pothole, an accident, a second vehicle, and an aggregate driving output of a driver of the second vehicle that is below a predetermined threshold value.

7. The method of claim 6, further comprising:
   determining the aggregate driving output of the driver of the second vehicle by extracting data from a database comprising a plurality of aggregate driving outputs; and
   transmitting, by the sensor data analysis and device control system, to the mobile device, and based on the aggregate driving output of the driver of the second vehicle, an instruction to capture additional images of the driver of the second vehicle.

8. The method of claim 7, wherein the plurality of aggregate driving outputs comprises an aggregate driving output of a driver of the first vehicle.

9. The method of claim 8, further comprising:
   receiving, by the sensor data analysis and device control system, a reaction of the driver of the first vehicle to the instruction output; and
   updating, by the sensor data analysis and device control system and responsive to receiving the reaction, the aggregate driving output of the driver of the first vehicle.

10. The method of claim 1, wherein the generating the notification output comprises:
    generating, by the sensor data analysis and device control system and based on historical data, a risk map;
    generating, by the sensor data analysis and device control system, an indication of the potential hazard on the risk map; and
    transmitting, by the sensor data analysis and device control system and to the mobile device, the risk map for display on the mobile device.

11. An apparatus comprising:
    a memory; and
    a processor coupled to the memory and programmed with computer-executable instructions for performing steps comprising:
       transmitting, by a sensor data analysis and device control system including a processor and to a mobile device, an instruction to position an orientation of the mobile device within a first vehicle;
       receiving, by the sensor data analysis and device control system and from the mobile device, initial sensor data comprising sensor data around and within the first vehicle collected during or after the positioning;
       analyzing, in real-time and by the sensor data analysis and device control system, the initial sensor data to identify a potential hazard;
       receiving, after the identifying the potential hazard, by the sensor data analysis and device control system, and from the mobile device, additional sensor data associated with the potential hazard;
       determining, by the sensor data analysis and device control system and based on the initial sensor data and the additional sensor data, a customized driving assistance output associated with the potential hazard;
       generating, by the sensor data analysis and device control system and based on the customized driving assistance output, a notification output comprising an indication of the potential hazard; and
       generating, by the sensor data analysis and device control system and after the generating the notification output, an instruction output comprising an instruction to modify a position or operation of the first vehicle responsive to the potential hazard; and
       transmitting the notification output and the instruction output to the mobile device.

12. The apparatus of claim 11, wherein the generating the notification output comprises:
    generating, by the sensor data analysis and device control system, an output to be displayed on one of a plurality of windows comprising the first vehicle, wherein the one of the plurality of windows is closer to the potential hazard than other windows comprising the plurality of windows; and transmitting, to an operating system of the first vehicle, an instruction to display the notification output on the one of the plurality of windows.

13. The apparatus of claim 11, wherein the instruction output comprises one of: an instruction for a driver of the first vehicle to take an action responsive to the potential hazard or an instruction for an operating system of the first vehicle to cause the first vehicle to perform the action responsive to the potential hazard.

14. The apparatus of claim 13, wherein the instruction output comprises an instruction to change lanes.

15. The apparatus of claim 11, wherein the mobile device is mounted in a cradle and wherein the instruction to position the mobile device comprises instructing the mobile device to initiate rotation of the cradle.

16. The apparatus of claim 11, wherein the instruction to position the mobile device comprises an instruction to initiate at least one of: horizontal rotation of the mobile device, vertical rotation of the mobile device, or a combination of horizontal and vertical rotations of the mobile device.

17. The apparatus of claim 11, wherein the mobile device comprises the sensor data analysis and device control system.

18. A non-transitory computer readable medium storing computer executable instructions, which when executed by a processor, cause a computing device to perform steps comprising:

transmitting, by a sensor data analysis and device control system including a processor and to a mobile device, an instruction to position an orientation of the mobile device within a first vehicle;

receiving, by the sensor data analysis and device control system and from the mobile device, initial sensor data comprising sensor data around and within the first vehicle collected during or after the positioning;

analyzing, in real-time and by the sensor data analysis and device control system, the initial sensor data to identify a potential hazard;

receiving, after the identifying the potential hazard, by the sensor data analysis and device control system, and from the mobile device, additional sensor data associated with the potential hazard;

determining, by the sensor data analysis and device control system and based on the initial sensor data and the additional sensor data, a customized driving assistance output associated with the potential hazard;

generating, by the sensor data analysis and device control system and based on the customized driving assistance output, a notification output comprising an indication of the potential hazard; and generating, by the sensor data analysis and device control system and after the generating the notification output, an instruction output comprising an instruction to modify a position or operation of the first vehicle responsive to the potential hazard; and transmitting the notification output and the instruction output to the mobile device.

19. The non-transitory computer readable medium of claim 18, wherein the computing device is further configured to perform:

comparing, by the sensor data analysis and device control system, the customized driving assistance output to a predetermined driving assistance threshold; and determining, by the sensor data analysis and device control system and based on the comparing, to generate the notification output.

20. The non-transitory computer readable medium of claim 19, wherein the computing device is further configured to perform:

analyzing, in real-time and by the sensor data analysis and device control system and after the generating the instruction output, the initial sensor data to identify a second potential hazard;

receiving, by the sensor data analysis and device control system, after the determining the second potential hazard, and from the mobile device, second additional sensor data associated with the second potential hazard;

determining, by the sensor data analysis and device control system and based on the initial sensor data and the second additional sensor data, a second customized driving assistance output associated with the second potential hazard;

determining, by the sensor data analysis and device control system, that the second customized driving assistance output is below the predetermined driving assistance threshold; and determining, by the sensor data analysis and device control system and based on the determination that the customized driving assistance output is below the predetermined driving assistance threshold, that a second notification output should not be generated.

* * * * *